(12) United States Patent
Yoneda et al.

(10) Patent No.: US 12,103,633 B2
(45) Date of Patent: Oct. 1, 2024

(54) HUB-ASSEMBLY FOR HUMAN-POWERED VEHICLE

(71) Applicant: Shimano Inc., Osaka (JP)

(72) Inventors: Yuuya Yoneda, Osaka (JP); Kenkichi Inoue, Osaka (JP); Azusa Yamazaki, Osaka (JP)

(73) Assignee: Shimano Inc., Osaka (JP)

( * ) Notice: Subject to any disclaimer, the term of this patent is extended or adjusted under 35 U.S.C. 154(b) by 572 days.

(21) Appl. No.: 17/392,729

(22) Filed: Aug. 3, 2021

(65) Prior Publication Data
US 2023/0037945 A1    Feb. 9, 2023

(51) Int. Cl.
*B62K 25/02*   (2006.01)
*B60B 27/02*   (2006.01)
*B62M 6/60*    (2010.01)
*B62M 9/12*    (2006.01)

(52) U.S. Cl.
CPC ............ *B62K 25/02* (2013.01); *B60B 27/023* (2013.01); *B62M 6/60* (2013.01); *B62M 9/12* (2013.01)

(58) Field of Classification Search
CPC .. B62J 11/19; B62J 6/12; H02K 7/003; B62K 25/02; B60B 27/023; B62M 6/40; B62M 6/60; B62M 9/12
USPC ...................................................... 310/67 A
See application file for complete search history.

(56) References Cited

U.S. PATENT DOCUMENTS

| | | | |
|---|---|---|---|
| 1,055,598 A * | 3/1913 | Balachowsky et al. | B61C 9/38 |
| | | | 105/57 |
| 5,268,602 A * | 12/1993 | Schwaller | H02K 21/14 |
| | | | 310/67 A |
| 6,605,884 B2 * | 8/2003 | Nishimoto | H02K 5/225 |
| | | | 301/124.1 |
| 6,924,569 B2 | 8/2005 | Endo et al. | |
| 6,992,413 B2 * | 1/2006 | Endo | H02K 1/145 |
| | | | 310/67 A |
| 8,405,263 B2 * | 3/2013 | Ando | H02K 7/1846 |
| | | | 310/67 A |
| 2005/0029879 A1 * | 2/2005 | Endo | B62J 6/12 |
| | | | 310/75 C |

(Continued)

FOREIGN PATENT DOCUMENTS

| | | |
|---|---|---|
| CN | 205264613 U | 5/2016 |
| CN | 109094714 A | 12/2018 |

(Continued)

*Primary Examiner* — Kip T Kotter
(74) *Attorney, Agent, or Firm* — Global IP Counselors, LLP

(57) ABSTRACT

A hub assembly is provided for a human-powered vehicle. The hub assembly includes a hub axle, a hub body, a cable and a cable protector. The hub axle has a first axial end and a second axial end. The hub body is rotatably mounted on the hub axle to rotate around a rotational center axis of the hub assembly. The cable has a first portion disposed inside of the hub assembly and a second portion disposed outside of the hub assembly. The cable protector is movably arranged between a first position and a second position. The second portion of the cable extends along the rotational center axis where the cable protector is in the first position. The second portion of the cable being at least partly restrained in an angled position with respect to the rotational center axis where the cable protector is in the second position.

21 Claims, 17 Drawing Sheets

(56) References Cited

U.S. PATENT DOCUMENTS

| | | | | |
|---|---|---|---|---|
| 2018/0170099 A1* | 6/2018 | Yamazaki | ................... | B62J 6/12 |
| 2018/0362108 A1* | 12/2018 | Yamazaki | ................... | B62J 6/12 |
| 2022/0388332 A1* | 12/2022 | Inoue | ......................... | B62J 6/12 |
| 2022/0410999 A1* | 12/2022 | Yamazaki | ................ | H02K 5/10 |
| 2022/0411003 A1* | 12/2022 | Yamazaki | ................ | B62J 45/00 |

FOREIGN PATENT DOCUMENTS

| | | |
|---|---|---|
| CN | 211480851 U | 9/2020 |
| EP | 1 612 132 A2 | 1/2006 |
| JP | 2005-170122 A | 6/2005 |
| TW | M281809 U | 12/2005 |

* cited by examiner

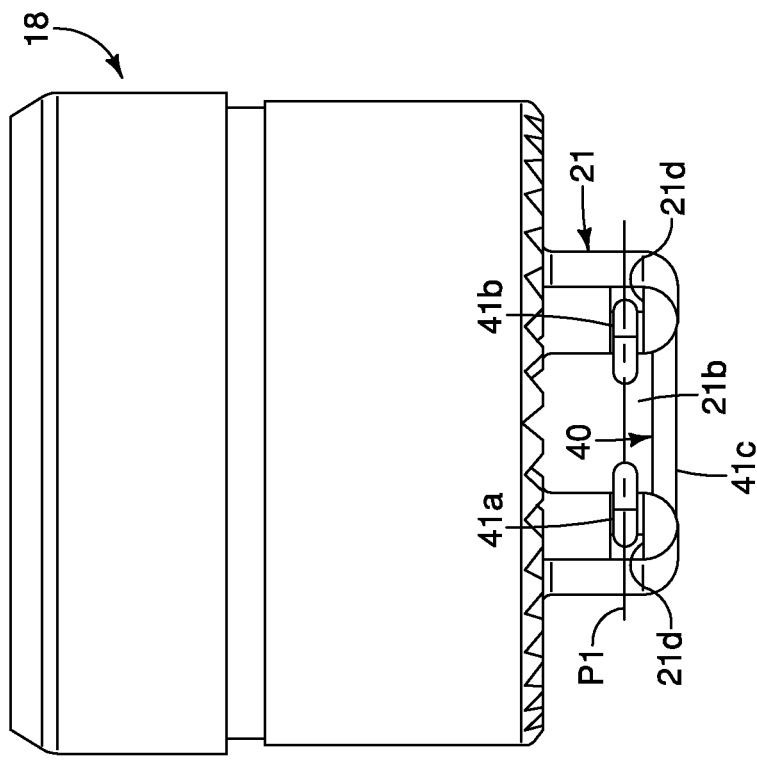
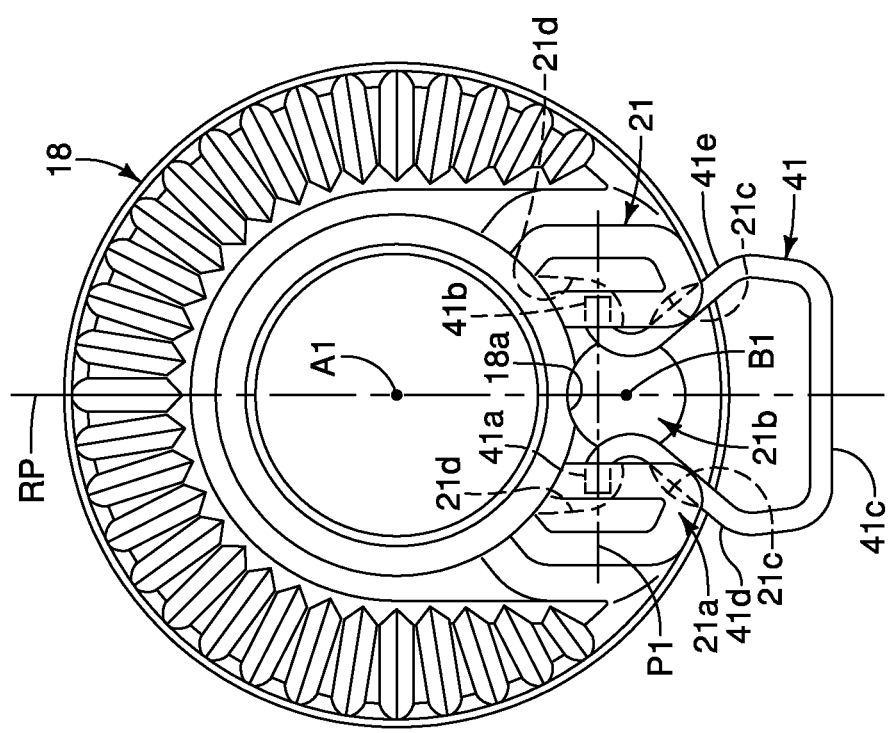
FIG. 24
FIG. 23

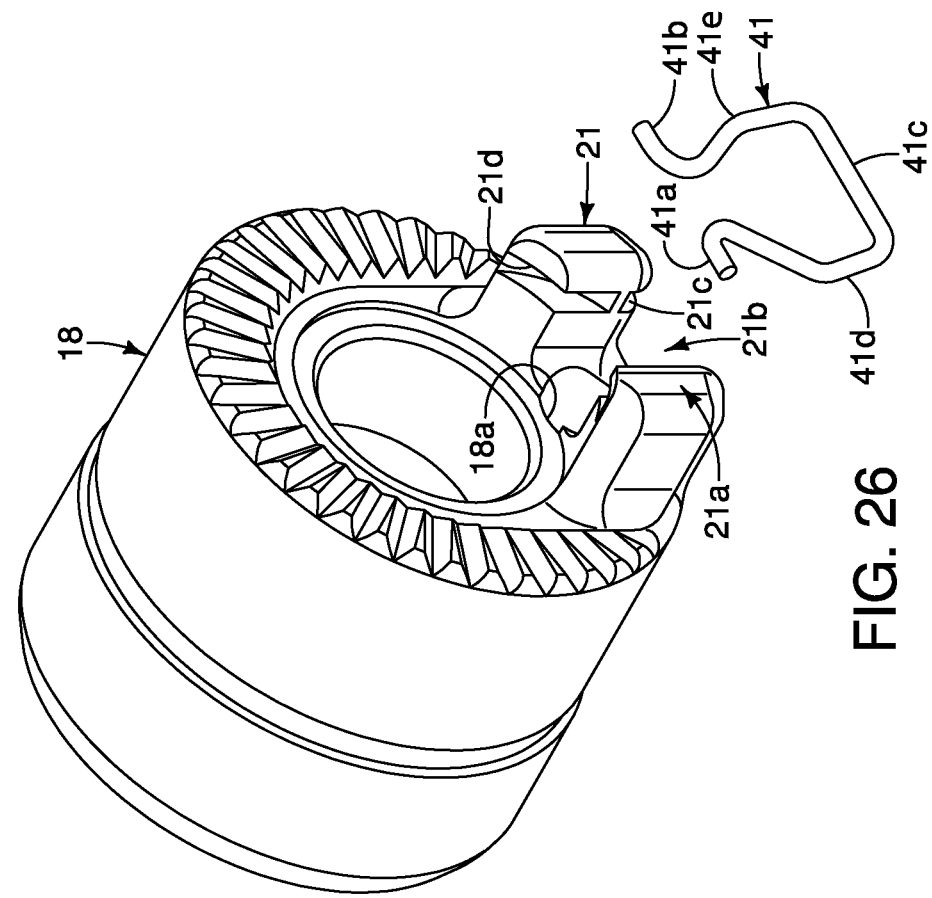
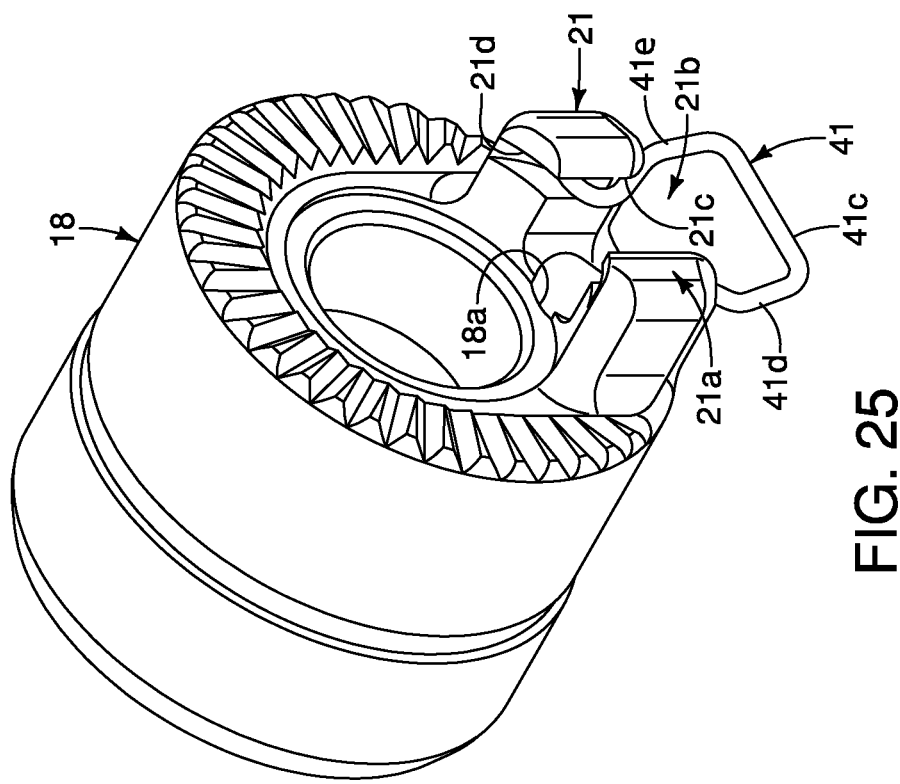

HUB-ASSEMBLY FOR HUMAN-POWERED VEHICLE

BACKGROUND

Technical Field

This disclosure generally relates to a hub assembly for a human-powered vehicle.

Background Information

Some wheels for human-powered vehicles (e.g., bicycle) have a hub, a plurality of spokes and an annular rim. The hub has a hub axle that is non-rotatably mounted to a frame of the human-powered vehicle. The hub has a hub body that is coaxially coupled to the hub axle so that the hub body is disposed radially outwardly with respect to the hub axle. The bearings are configured and arranged to support the hub body so that the hub body can freely rotate around the hub axle. In almost all types of bicycles except fixed gear and track racers, a wheel of the bicycle, typically the rear wheel, is provided with a bicycle freewheel that is arranged on a hub of the wheel. The bicycle freewheel usually has a one-way clutch function whereby it only transfers torque in one direction. Thus, freewheels are used so that the bicycle can advance freely without any rotation of the pedals (i.e., during coasting). During coasting, the bicycle freewheel is considered to be in a state of freewheeling in which the bicycle wheel can freely rotate while the sprockets remain stationary.

SUMMARY

Generally, the present disclosure is directed to various features of a hub assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a hub assembly is provided for a human-powered vehicle. The hub assembly basically comprises a hub axle, a hub body, a cable and a cable protector. The hub axle has a first axial end and a second axial end. The hub body is rotatably mounted on the hub axle to rotate around a rotational center axis of the hub assembly. The cable has a first portion disposed inside of the hub assembly and a second portion disposed outside of the hub assembly. The cable protector is movably arranged with respect to the hub axle between a first position and a second position. The second portion of the cable extends along the rotational center axis where the cable protector is in the first position. The second portion of the cable is at least partly restrained in an angled position with respect to the rotational center axis where the cable protector is in the second position.

With the hub assembly according to the first aspect, the cable can be pulled along the rotational center axis of the hub assembly where the cable protector is in the first position, but is restrained from movement along the rotational center axis of the hub assembly where the cable protector is in the second position.

In accordance with a second aspect of the present disclosure, the hub assembly according to the first aspect is configured so that the cable protector is pivotally mounted with respect to the hub axle between the first position and the second position.

With the electrical assembly according to the second aspect, the cable protector can be easily moved between the first position and the second position.

In accordance with a third aspect of the present disclosure, the hub assembly according to the second aspect is configured so that the cable protector has a pivot axis that extends in a twisted or intersecting relationship with respect to the rotational center axis of the hub body.

With the electrical assembly according to the third aspect, the cable protector can be compactly arranged.

In accordance with a fourth aspect of the present disclosure, the hub assembly according to any one of the first aspect to the third aspect is configured so that the cable protector is a wire rod.

With the electrical assembly according to the fourth aspect, the cable protector can be easily and inexpensively manufactured. The cable protector can be elastic.

In accordance with a fifth aspect of the present disclosure, the hub assembly according to any one of the first aspect to the fourth aspect is configured so that the first portion of the cable is at least partly extending along the rotational center axis.

With the electrical assembly according to the fifth aspect, the cable can be pulled along the rotational center axis of the hub assembly where the cable protector is in the first position.

In accordance with a sixth aspect of the present disclosure, the hub assembly according to the fifth aspect is configured so that the wire rod has a first end disposed on a first side of a reference plane and a second end disposed on a second side of the reference plane in a case where the reference plane entirely contains the rotational center axis and is perpendicular to a pivot axis of the cable protector.

With the electrical assembly according to the sixth aspect, the cable can be reliably restrained where the cable protector is in the second position.

In accordance with a seventh aspect of the present disclosure, the hub assembly according to any one of the first aspect to the sixth aspect further comprises a rotation restriction part configured to be disposed between the hub axle and a frame of the human-powered vehicle so that rotation of the hub axle relative to the frame is restricted.

With the electrical assembly according to the seventh aspect, the hub assembly can be easily installed in the appropriate orientation.

In accordance with an eighth aspect of the present disclosure the hub assembly according to the seventh aspect is configured so that the rotation restriction part is detachably attached to the hub axle.

With the hub assembly according to the eighth aspect, the rotation restriction part can be easily and inexpensively manufactured and installed in the appropriate orientation with respect to the cable. The rotation restriction part is easily replaced.

In accordance with a ninth aspect of the present disclosure, the hub assembly according to the seventh aspect or the eighth aspect is configured so that the rotation restriction part includes a cable guide structure configured to guide the second portion of the cable in an angled direction with respect to the rotational center axis.

With the hub assembly according to the ninth aspect, the cable can be appropriately guided to avoid interfering with other parts of the human-powered vehicle.

In accordance with a tenth aspect of the present disclosure, the hub assembly according to the ninth aspect is configured so that the cable guide structure is further configured to guide the cable in a radial direction of the hub axle.

With the hub assembly according to the tenth aspect, the cable can be guided to avoid contact with other parts of the human-powered vehicle.

In accordance with an eleventh aspect of the present disclosure, the hub assembly according to the ninth aspect or the tenth aspect is configured so that the cable guide structure includes a groove configured to guide the cable.

With the hub assembly according to the eleventh aspect, the cable guide structure can be inexpensively provided in a simple configuration.

In accordance with a twelfth aspect of the present disclosure, the hub assembly according to the eleventh aspect is configured so that the cable protector is attached inside the groove of the cable guide structure.

With the hub assembly according to the twelfth aspect, the cable protector can be easily attached to the rotation restriction part.

In accordance with a thirteenth aspect of the present disclosure, the hub assembly according to the eleventh aspect or the twelfth aspect is configured so that the cable protector includes a cable restricting portion that is wider than a width of the cable.

With the hub assembly according to the thirteenth aspect, the cable protector can reliably restrained where the cable protector is in the second position.

In accordance with a fourteenth aspect of the present disclosure, the hub assembly according to any one of the seventh aspect to the thirteenth aspect is configured so that the rotation restriction part includes a recess, and the cable protector is releasably retained in the recess where the cable protector is in the second position.

With the hub assembly according to the fourteenth aspect, the cable protector can be easily attached to the rotation restriction part and the cable protector can be easily placed in the second position with respect to the rotation restriction part.

In accordance with a fifteenth aspect of the present disclosure, the hub assembly according to the fourteenth aspect is configured so that the cable protector is resiliently deformed as the cable protector moved into and out of the recess.

With the hub assembly according to the fifteenth aspect, the cable protector can be easily installed on the rotation restriction part and uninstalled from the rotation restriction part. The cable protector 41 can be maintained in either the first position or the second position in an overridable manner.

In accordance with a sixteenth aspect of the present disclosure, the hub assembly according to any one of the first aspect to the fifteenth aspect further comprises an electric component that is non-rotatably disposed with respect to the hub axle, and the cable is an electric cable electrically connected to the electric component.

With the hub assembly according to the sixteenth aspect, it is possible to convey electricity to and/or from the hub.

In accordance with a seventeenth aspect of the present disclosure, the hub assembly according to the sixteenth aspect is configured so that the electric component including an electric circuit board, and the electric cable is electrically connected to the electric circuit board.

With the hub assembly according to the seventeenth aspect, it is possible to obtain various information regarding the hub assembly using the electric circuit board.

In accordance with an eighteenth aspect of the present disclosure, the hub assembly according to any one of the first aspect to the seventeenth aspect further comprises an electric power generator provided to the hub body, and configured to generate electric power by rotation of the hub body.

With the hub assembly according to the eighteenth aspect, it is possible to generate electric power from rotation of the hub.

In accordance with a nineteenth aspect of the present disclosure, the hub assembly according to any one of the first aspect to the eighteenth aspect further comprises a sprocket support structure rotatably disposed around the rotational center axis to transmit a driving force to the hub body while rotating in a driving rotational direction around the rotational center axis.

With the hub assembly according to the nineteenth aspect, the sprocket support structure functions as freewheel to allow the sprocket support structure to stop rotating during coasting.

In accordance with a twentieth aspect of the present disclosure, a hub assembly is provided for a human-powered vehicle, the hub assembly comprises a hub axle, a hub body, a cable and a cable protector. The hub axle has a first axial end and a second axial end. The hub body is rotatably mounted on the hub axle to rotate around a rotational center axis of the hub assembly. The cable has a first portion disposed inside of the hub assembly and a second portion disposed outside of the hub assembly. The cable protector is a wire rod and disposed on the hub axle. The second portion of the cable is at least partly restrained in an angled position with respect to the rotational center axis.

With the hub assembly according to the twentieth aspect, the cable can be restrained in a position to avoid interference with other parts of the human-powered vehicle.

Also, other objects, features, aspects and advantages of the disclosed hub assembly will become apparent to those skilled in the art from the following detailed description, which, taken in conjunction with the annexed drawings, discloses preferred embodiments of the disclosed hub assembly.

BRIEF DESCRIPTION OF THE DRAWINGS

Referring now to the attached drawings which form a part of this original disclosure:

FIG. 23 is an enlarged end elevational view of the end cap illustrated in FIGS. 20 to 22 but in which the cable protector is in the second (restricting) position;

FIG. 24 is an enlarged top view of the end cap illustrated in FIGS. 20 to 23 in which the cable protector is in the second (restricting) position;

FIG. 25 is an enlarged perspective view of the end cap illustrated in FIGS. 20 to 24 in which the cable protector is in the second (restricting) position; and FIG. 26 is an enlarged perspective view of the end cap illustrated in FIGS. 20 to 25 in which the cable protector has been detached from the end cap.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
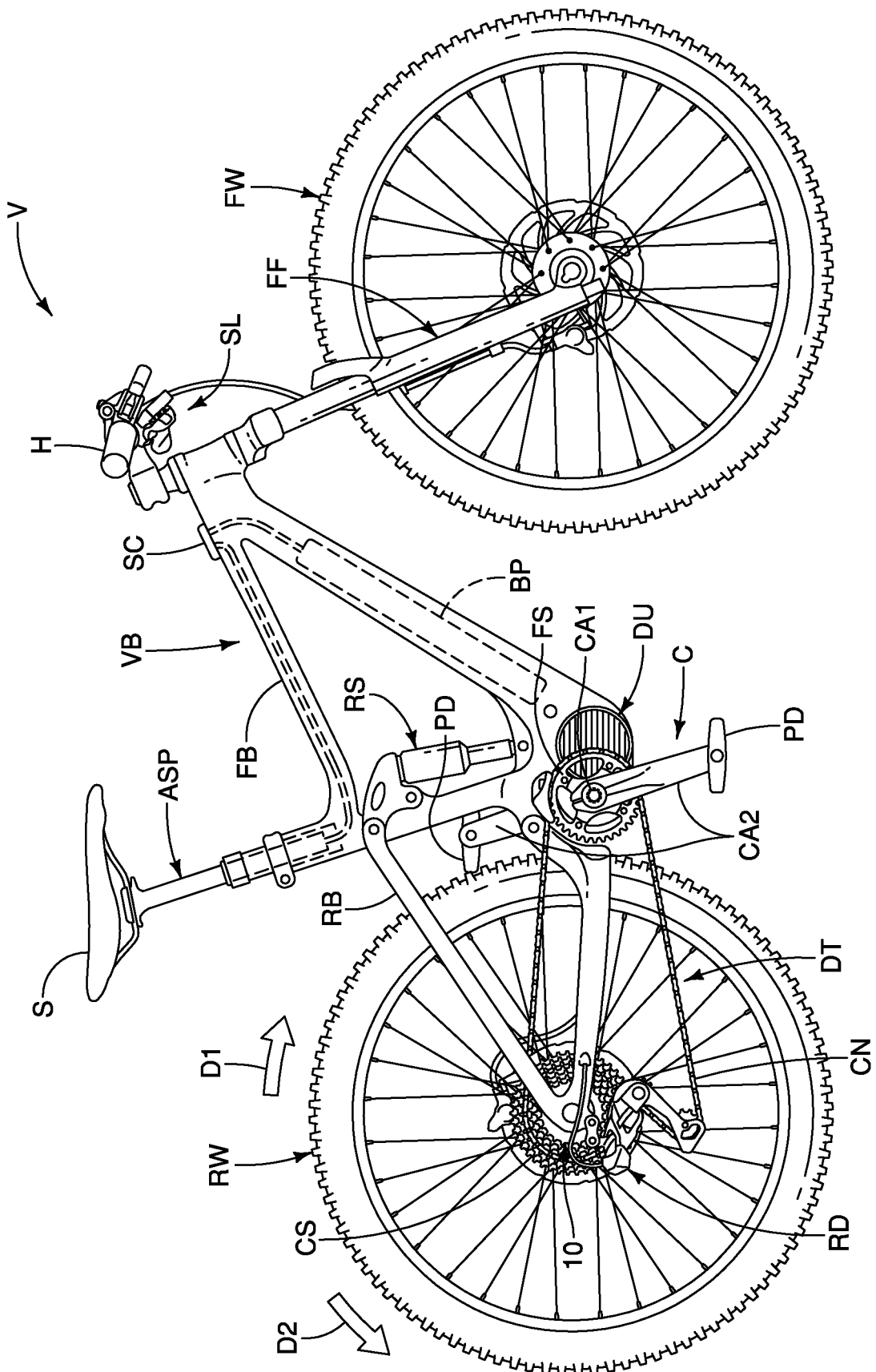
FIG. 1 is a side elevational view of a human-powered vehicle (i.e., bicycle) equipped with a hub assembly (i.e., a bicycle hub assembly) in accordance with a first embodiment.

Referring initially to FIG. 1, a hub assembly 10 is provided to a human-powered vehicle V. In other words, the human-powered vehicle V (i.e., a bicycle) is illustrated that is equipped with the hub assembly 10 in accordance with an illustrated embodiment. Here, in the illustrated embodiment, the hub assembly 10 is a bicycle hub. More specifically, the hub assembly 10 is a bicycle rear hub. Also, here, in the illustrated embodiment, the hub assembly 10 is a hub dynamo for providing electric power to one or more components of the human-powered vehicle V. However, the hub assembly 10 is not limited to a hub dynamo. In particular, certain aspects of the hub assembly 10 can be provided that does not generate electric power. Also, while the hub assembly 10 is illustrated as a rear hub, certain aspects of the hub assembly 10 can be provided to a front hub. Thus, the hub assembly 10 is not limited to a rear hub.

Here, the human-powered vehicle V is an electric assist bicycle (E-bike). Alternatively, the human-powered vehicle V can be a road bicycle, a city bike, a cargo bike, and a recumbent bike, or another type of off-road bicycle such as a cyclocross bicycle. As seen in FIG. 1, the human-powered vehicle V includes a vehicle body VB that is supported by a rear wheel RW and a front wheel FW. The vehicle body VB basically includes a front frame body FB and a rear frame body RB (a swing arm). The vehicle body VB is also provided with a handlebar H and a front fork FF for steering the front wheel FW. The rear frame body RB is swingably mounted to a rear section of the front frame body FB such that the rear frame body RB can pivot with respect to the front frame body FB. The rear wheel RW is mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The rear wheel RW is rotatably mounted to the rear frame body RB. The front wheel FW is mounted to the front frame body FB via the front fork FF. Namely, the front wheel FW is mounted to a lower end of the front fork FF. A height adjustable seatpost ASP is mounted to a seat tube of the front frame body FB in a conventional manner and supports a bicycle seat or saddle S in any suitable manner. The front fork FF is pivotally mounted to a head tube of the front frame body FB. The handlebar H is mounted to an upper end of a steering column or a steerer tube of the front fork FF. The front fork FF absorbs shock transmitted from the front wheel FW. Preferably, the rear shock absorber RS and the front fork FF are electrically adjustable suspensions. For example, the stiffness and/or stoke length of the rear shock absorber RS and the front fork FF can be adjusted.

The human-powered vehicle V further includes a drivetrain DT and an electric drive unit DU that is operatively coupled to the drivetrain DT. Here, for example, the drivetrain DT is a chain-drive type that includes a crank C, a front sprocket FS, a plurality of rear sprockets CS and a chain CN. The crank C includes a crank axle CA1 and a pair of crank arms CA2. The crank axle CA1 is rotatably supported to the front frame body FB via the electric drive unit DU. The crank arms CA2 are provided on opposite ends of the crank axle CA1. A pedal PD is rotatably coupled to the distal end of each of the crank arms CA2. The drivetrain DT can be selected from any type, and can be a belt-drive type or a shaft-drive type.

The electric drive unit DU has an electric motor that provides a drive assist force to the front sprocket FS. The electric drive unit DU can be actuated to assist in the propulsion of the human-powered vehicle V in a conventional manner. The electric drive unit DU is actuated, for example, in accordance with a human driving force applied to the pedals PD. The electric drive unit DU is actuated by electric power supplied from a main battery pack BP that is mounted on a downtube of the human-powered vehicle V. The main battery pack BP can provide electrical power to other vehicle components such as the rear derailleur RD, the height adjustable seatpost ASP, the rear shock absorber RS, the front fork FF and any other vehicle component that uses electrical power.

The human-powered vehicle V further includes a cycle computer SC. Here, the cycle computer SC is mounted to the front frame body FB. Alternatively, the cycle computer SC can be provided on the handlebar H. The cycle computer SC notifies the rider of various traveling and/or operating conditions of the human-powered vehicle V. The cycle computer SC can also include various control programs for automatically controlling one or more vehicle components. For example, the cycle computer SC can be provided with an automatic shifting program for changing gears of the rear derailleur RD based on one or more traveling and/or operating conditions of the human-powered vehicle V.

Here, the human-powered vehicle V further includes a rear derailleur RD that is attached to the rear frame body RB for shifting the chain CN between the rear sprockets CS. The rear derailleur RD is one type of gear changing device. Here, the rear derailleur RD is an electric derailleur (i.e., an electric gear changing device or an electric transmission device). Here, the rear derailleur RD is provided on the rear side of the rear frame body RB near the hub assembly 10. The rear derailleur RD can be operated when a rider of the human-powered vehicle V manually operates a gear shift operating device or shifter SL. The rear derailleur RD can also be automatically operated based on traveling conditions and/or operating conditions of the human-powered vehicle V. The human-powered vehicle V can further include a plurality of electronic components. Some or all of the electronic components can be supplied with electric power generated by the hub assembly 10 during a power generation state as discussed herein.

The structure of the hub assembly 10 will now be described with particular reference to FIGS. 2 to 8. The hub assembly comprises a hub axle 12 and a hub body 14. The hub axle 12 is configured to be non-rotatably attached to the vehicle body VB. In this embodiment, the hub axle 12 is configured to be non-rotatably attached to the rear frame body RB. The hub body 14 is rotatably mounted on the hub axle 12 to rotate around a rotational center axis A1 of the hub assembly 10. The hub axle 12 has a center axis coaxial with the rotational center axis A1. The hub body 14 is rotatably disposed around the rotational center axis A1. In other words, the hub body 14 is rotatably mounted around the hub axle 12.

Figure 4:
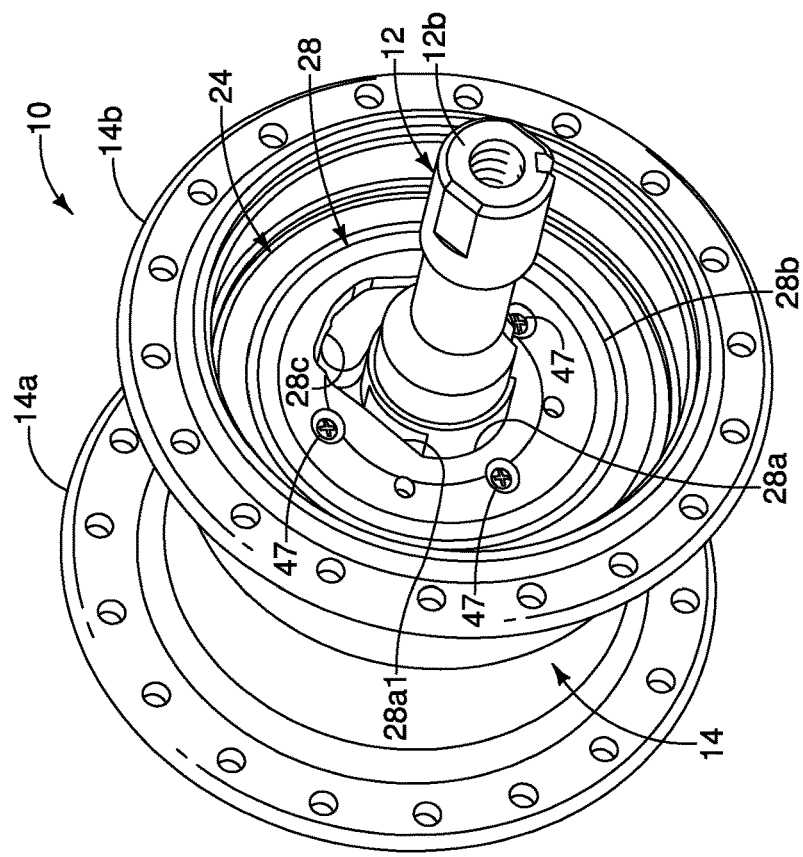
FIG. 4 is a perspective view of the hub assembly illustrated in FIGS. 2 and 3 but in which selective part have been removed to show the bearing spacer.
Figure 5:
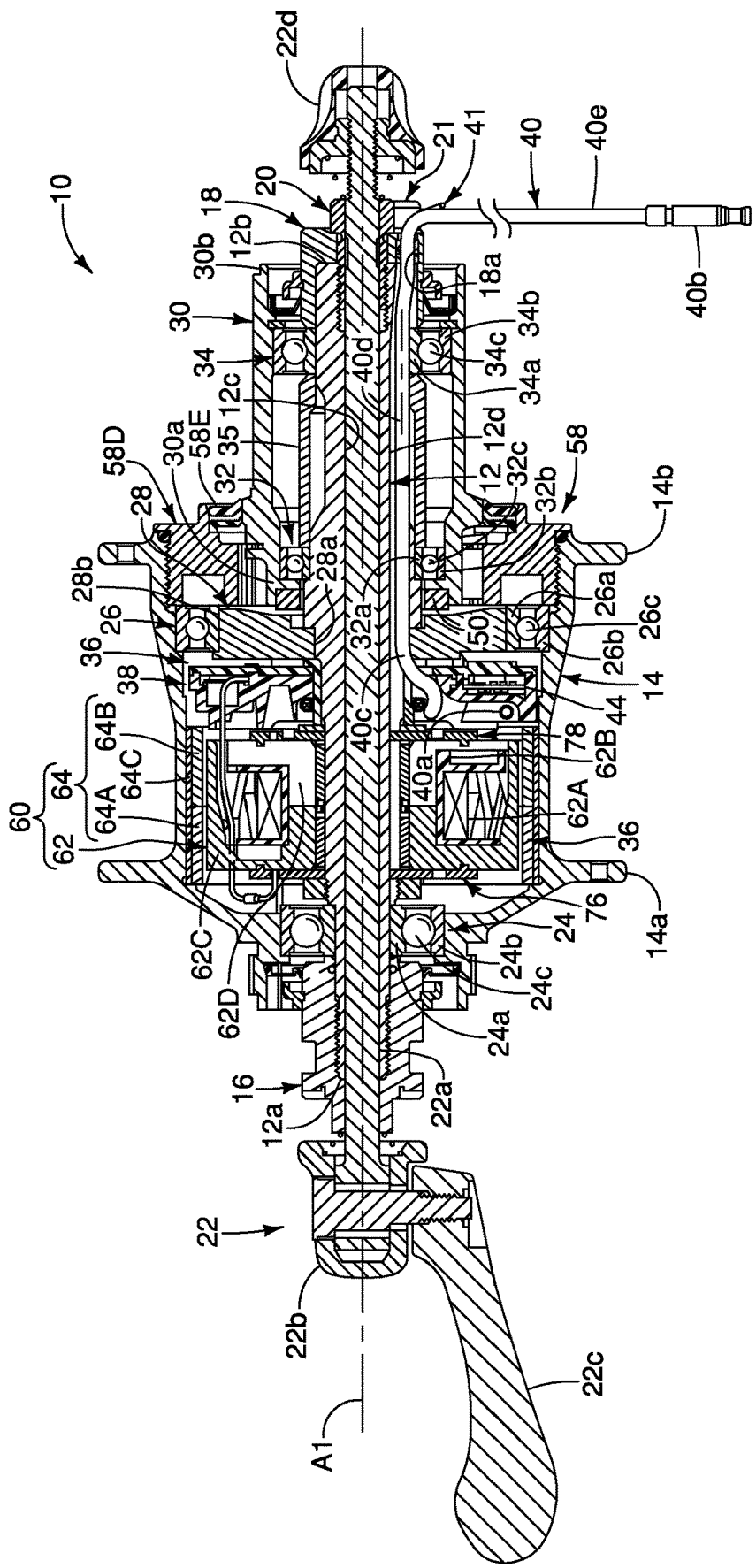
FIG. 5 is a longitudinal cross-sectional view of the hub assembly illustrated in FIGS. 2 to 4 as seen along section line 5-5 in FIG. 3.
Figure 6:
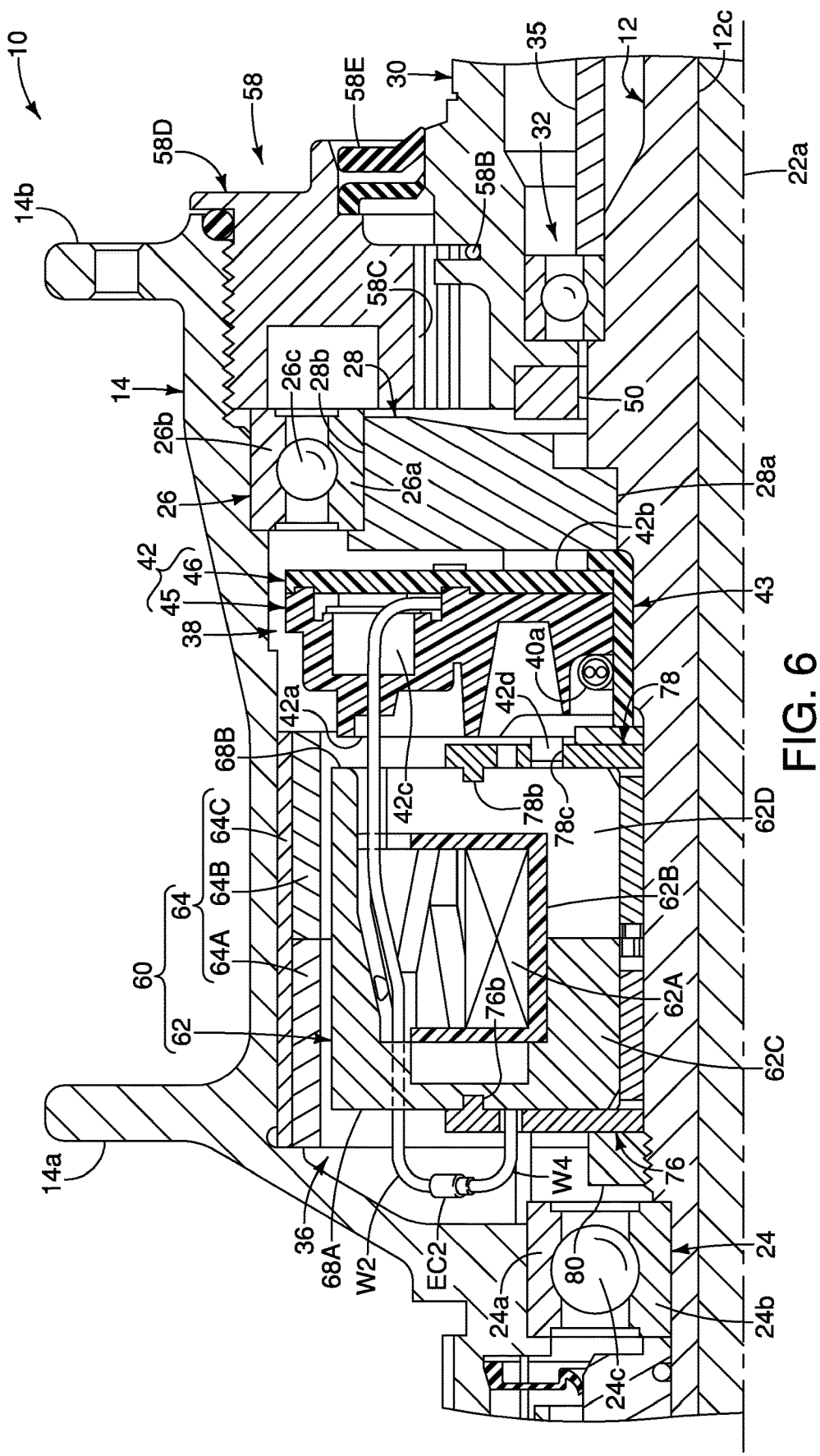
FIG. 6 is an enlarged cross-sectional view of a first portion of the hub assembly illustrated in FIG. 5.
Figure 7:
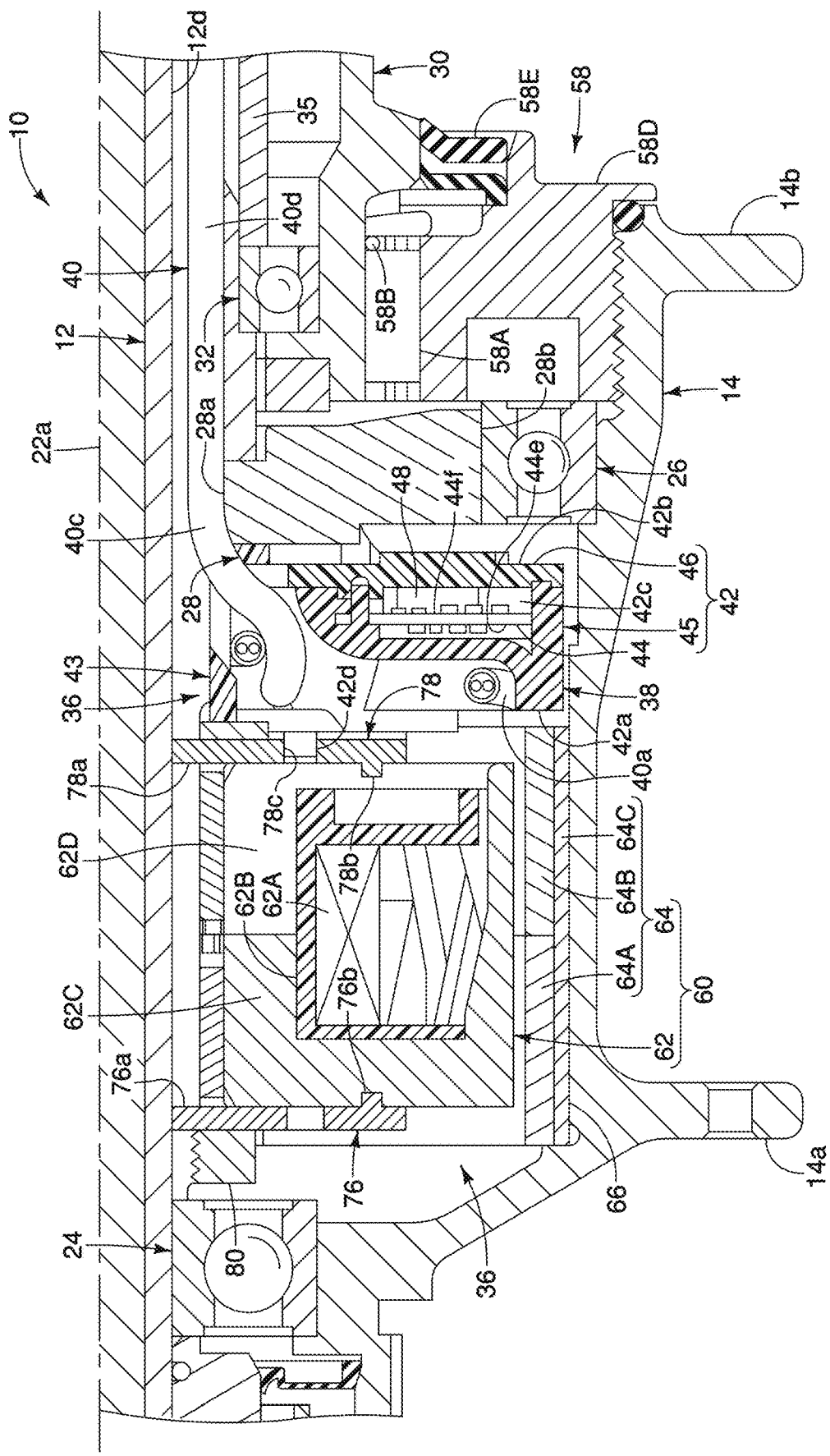
FIG. 7 is an enlarged cross-sectional view of a second portion of the hub assembly illustrated in FIG. 5.

As seen in FIGS. 5 to 7, the hub axle 12 is a rigid member made of a suitable material such as a metallic material. The hub axle 12 has a first axial end 12a and a second axial end 12b. Here, the hub axle 12 is a tubular member. Thus, the hub axle 12 has an axial bore 12c that extends between the first axial end 12a and the second axial end 12b. The hub axle 12 can be a one-piece member or made of several pieces. Here, the hub axle 12 is provided with a first end piece or end cap 16 and a second end piece or end cap 18. The first end cap 16 is mounted to the first axial end 12a (left side in FIGS. 2 to 8) of the hub axle 12, and the second end cap 18 is mounted to the second axial end 12b (right side in FIGS. 2 to 8) of the hub axle 12. For example, the first end cap 16 is threaded on the first axial end 12a of the hub axle 12, and the second end cap 18 is secured to the second axial end 12b of the hub axle 12 by a fixing bolt 20 that is threaded into the axial bore 12c of the hub axle 12. In this way, the first end cap 16 and the fixing bolt 20 are received in mounting openings of the rear frame body RB as seen in FIG. 2.

The hub assembly 10 further comprises a rotation restriction part 21 that is configured to be disposed between the hub axle 12 and a frame (the rear frame body RB) of the human-powered vehicle V so that rotation of the hub axle 12 relative to the frame (the rear frame body RB) is restricted. Here, the second end cap 18 includes the rotation restriction part 21 which is also received in one of the mounting openings of the rear frame body RB. The rotation restriction part 21 engages the rear frame body RB so that rotation of the hub axle 12 relative to the rear frame body RB is restricted. The second end cap 18 is detachably attached to the hub axle 12 using the fixing bolt 20. Thus, the rotation restriction part 21 is detachably attached to the hub axle 12.

Figure 2:
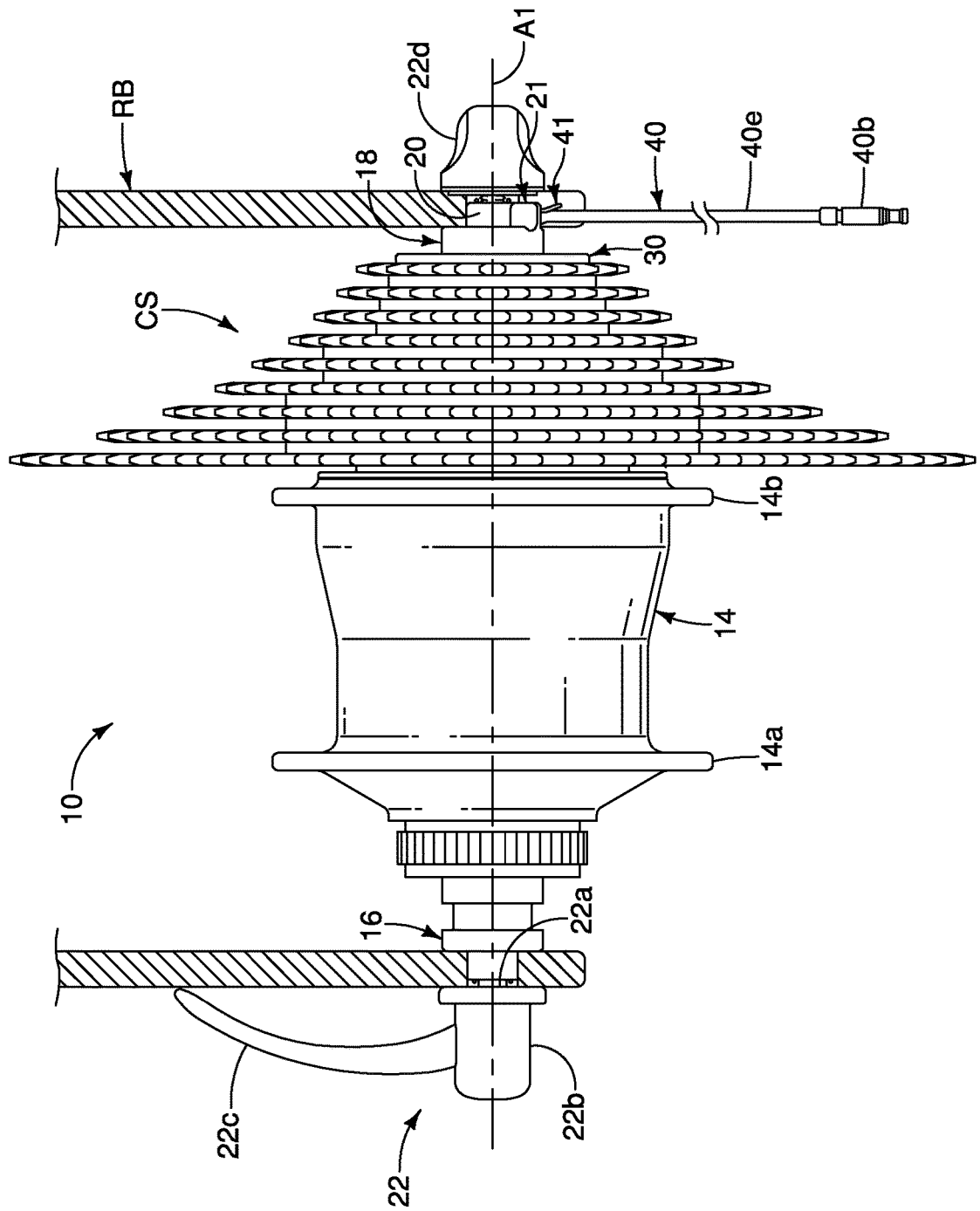
FIG. 2 is a longitudinal elevational view of the hub assembly attached to the vehicle body of the human-powered vehicle illustrated in FIG. 1.

Here, as seen in FIGS. 2 and 5, the hub assembly 10 further comprises a wheel holding mechanism 22 for securing the hub axle 12 of the hub assembly 10 to the rear frame body RB. The wheel holding mechanism 22 basically includes a shaft or skewer 22a, a cam body 22b, a cam lever 22c and an adjusting nut 22d. The cam lever 22c is attached to one end of the skewer 22a via the cam body 22b, while the adjusting nut 22d is threaded on the other end of the skewer 22a. The cam lever 22c is attached to the cam body 22b. The cam body 22b is coupled between the skewer 22a and the cam lever 22c to move the skewer 22a relative to the cam body 22b. Thus, the cam lever 22c is operated to move the skewer 22a in the axial direction of the rotational center axis A1 with respect to the cam body 22b to change the distance between the cam body 22b and the adjusting nut 22d. Preferably, a compression spring is provided at each end of the skewer 22a. The wheel holding mechanism 22 is sometimes called a quick release skewer. The wheel holding mechanism 22 is typically used with a frame having a pair of U-shaped axle attachments that each have an open-ended slot for receiving a portion of the skewer 22a. Alternatively, the hub axle 12 can be non-rotatably attached to the rear frame body RB with other attachment structures as needed and/or desired.

Figure 3:
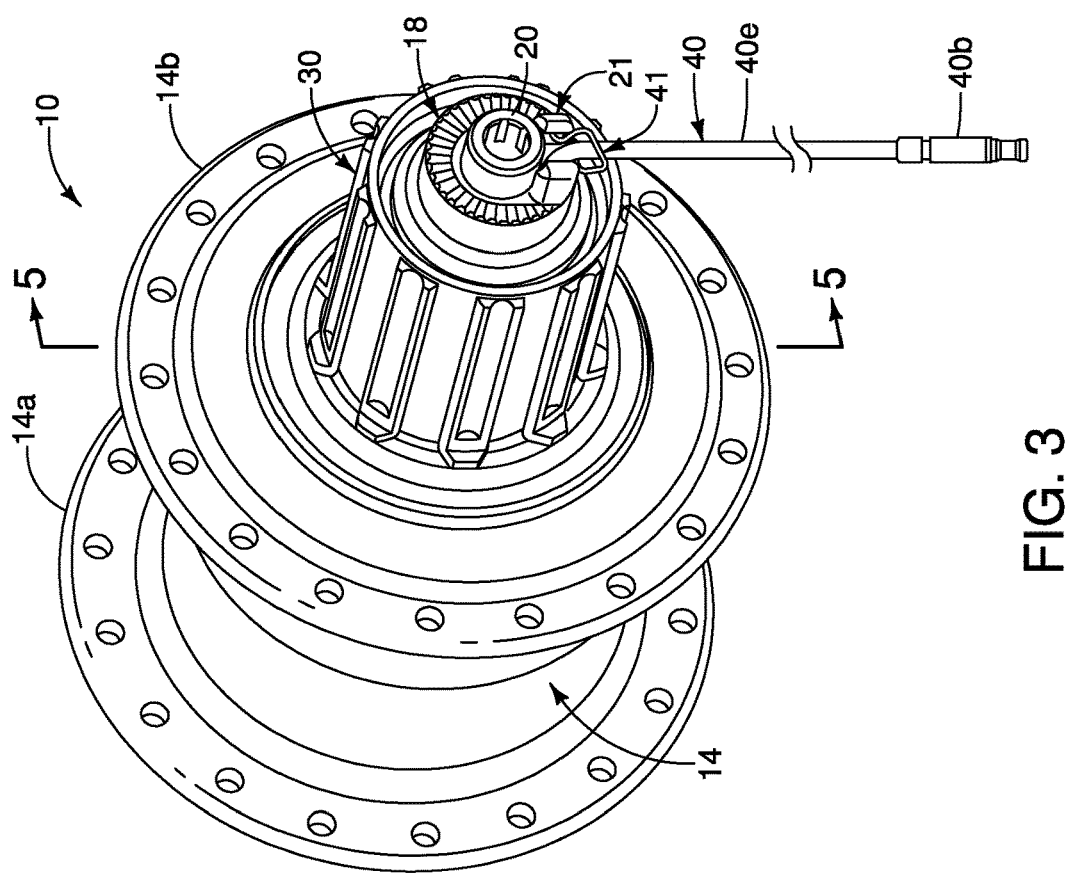
FIG. 3 is a perspective view of the hub assembly illustrated in FIG. 1.

As indicated in FIGS. 1, 3 and 4, the hub body 14 is rotatably mounted around the hub axle 12 to rotate in a driving rotational direction D1. The driving rotational direction D1 corresponds to a forward driving direction of the rear wheel RW. The hub body 14 is configured to support the rear wheel RW in a conventional manner. More specifically, in the illustrated embodiment, the hub body 14 includes a first outer flange 14a and a second outer flange 14b. The first outer flange 14a and the second outer flange 14b extend radially outward with respect to the rotational center axis A1 from a peripheral surface of the hub body 14. The first outer flange 14a and the second outer flange 14b are configured to receive a plurality of spokes (FIG. 1) for attaching a rim (FIG. 1) of the rear wheel RW to the hub body 14. In this way, the hub body 14 and the rear wheel RW are coupled to rotate together.

As seen FIGS. 5 to 7, the hub assembly 10 further comprises a first hub body bearing 24. The first hub body bearing 24 rotatably supports the hub body 14. Preferably, the hub assembly 10 further comprises a second hub body bearing 26 rotatably supporting an end of the hub body 14. The first hub body bearing 24 rotatably supports the other end of the hub body 14 with respect to the rotational center axis A1. The first hub body bearing 24 includes a first inner race 24a, a first outer race 24b and a plurality of first roller elements 24c. The first roller elements 24c are disposed between the first inner race 24a and the first outer race 24b. The second hub body bearing 26 includes a second inner race 26a, a second outer race 26b and a plurality of second roller elements 26c. The second roller elements 26c are disposed between the second inner race 26a and the second outer race 26b. The first hub body bearing 24 and the second hub body bearing 26 are radial ball bearings. Radial ball bearings support force in the direction perpendicular to the axis. Further, a radial roller bearing can be adopted instead of the radial ball bearing. Radial roller bearings include cylindrical roller bearings and needle roller bearings.

Here, the hub assembly 10 further comprises a bearing spacer 28. The bearing spacer 28 is provided on the hub axle 12 and supports the hub body 14 via the second hub body bearing 26. The bearing spacer 28 supports the second hub body bearing 26. The bearing spacer 28 has an inner peripheral end 28a provided to the hub axle 12 and an outer peripheral end 28b spaced radially outward of the inner peripheral end 28 in a radial direction with respect to the rotational center axis A1. The second hub body bearing 26 is disposed at the outer peripheral end 28b of the bearing spacer 28 and rotatably supports the hub body 14. The bearing spacer 28 is non-rotatable with respect to the hub axle 12. In particular, as seen in FIG. 4, the inner peripheral end 28a defines a non-circular opening 28a1 that mates with a non-circular portion of the hub axle 12 to non-rotatably couple the bearing spacer 28 with respect to the hub axle 12. The axial position of the bearing spacer 28 with respect to the hub axle 12 can be determined by being sandwiched between a step provided on the hub axle 12 and a nut screwed to the hub axle 12. Here, the bearing spacer 28 includes an axial opening 28c.

Here, the hub assembly 10 further comprises a sprocket support structure 30. In the illustrated embodiment, the sprocket support structure 30 supports the rear sprockets CS as seen in FIG. 2. The sprocket support structure 30 is rotatably disposed around the rotational center axis A1 to transmit a driving force to the hub body 14 while rotating in a driving rotational direction around the rotational center axis A1. As explained below, the sprocket support structure 30 does not transmit a driving force to the hub body 14 while rotating in a non-driving rotational direction D2 around the rotational center axis A1. The non-driving rotational direction D2 is opposite to the driving rotational direction D1 with respect to the rotational center axis A1. The rotational center axis of the sprocket support structure 30 is disposed concentrically with the rotational center axis A1 of the hub assembly 10.

While the sprocket support structure 30 is configured to non-rotatably support the rear sprockets CS, the sprocket support structure 30 is not limited to the illustrated embodiment. Alternatively, one or more of the rear sprockets CS can be integrally formed with the sprocket support structure 30. In any case, the sprocket support structure 30 and the rear sprockets CS are coupled together to rotate together in both the driving rotational direction D1 and the non-driving rotational direction D2.

The hub assembly 10 further comprises a first sprocket support bearing 32 and a second sprocket support bearing 34. The first sprocket support bearing 32 rotatably supports a first end 30a of the sprocket support structure 30. The second sprocket support bearing 34 rotatably supports a second end 30b of the sprocket support structure 30. The first sprocket support bearing 32 and the second sprocket support bearing 34 have outer diameters that are smaller than the outer peripheral end 28b of the bearing spacer 28. The inner diameter of the first sprocket support bearing 32 is larger than the inner diameter of the second sprocket support bearing 34. Thus, the first sprocket support bearing 32 and the second sprocket support bearing 34 can be mounted on the hub axle 12 from the second axial end 12b of the hub axle 12. The first sprocket support bearing 32 includes a first inner race 32a, a first outer race 32b and a plurality of first roller elements 32c. The first roller elements 32c are disposed between the first inner race 32a and the first outer race 32b. The second sprocket support bearing 34 includes a second inner race 34a, a second outer race 34b and a plurality of second roller elements 34c. The second roller elements 34c are disposed between the second inner race 34a and the second outer race 34b. Here, the first sprocket support bearing 32 and the second sprocket support bearing 34 are radial ball bearings. Radial ball bearings support force in the direction perpendicular to the axis. Further, a radial roller bearing can be adopted instead of the radial ball bearing. Radial roller bearings include cylindrical roller bearings and needle roller bearings. A tubular spacing element 35 is disposed between the first sprocket support bearing 32 and the second sprocket support bearing 34.

As seen in FIGS. 5 to 7, the hub assembly 10 further comprises an electrical assembly 36. The electrical assembly 36 comprises an electric component 38. Thus, the hub assembly 10 further comprises the electric component 38. The electric component 38 is non-rotatably disposed with respect to the hub axle 12, and the cable 40 is an electric cable electrically connected to the electric component. While the electric component 38 is part of the hub assembly 10, the electric component 38 can be used with other components of the human-powered vehicle. The electric component 38 has an opening 38a for receiving the hub axle 12 therethrough. Thus, the electric component 38 is supported on the hub axle 12. As explained later, the electric component 38 is non-rotatably disposed on the hub axle 12.

Figure 9:
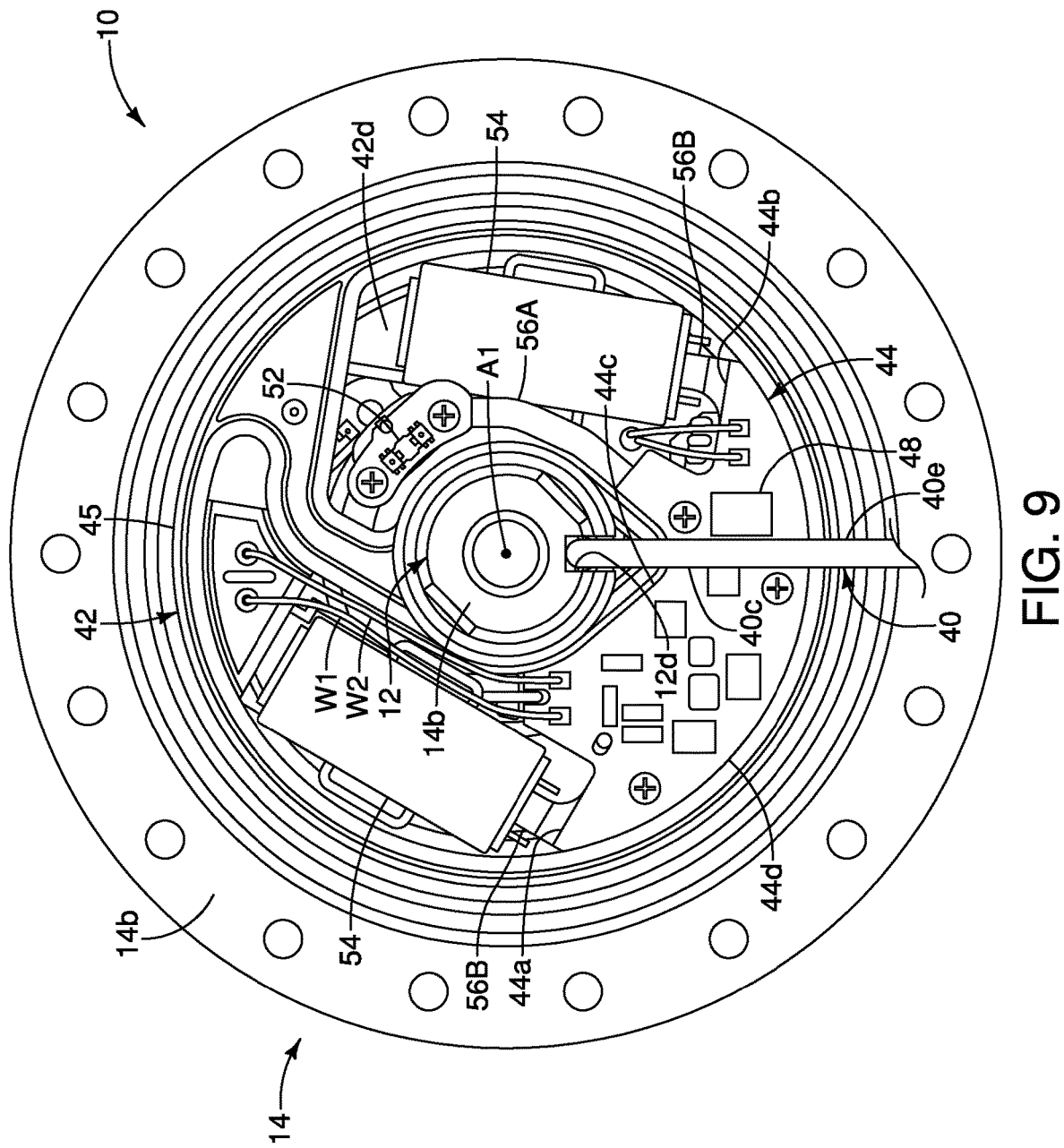
FIG. 9 is an end elevational view of the hub assembly illustrated in FIGS. 2 to 5 in which selected part of the hub have been removed.

The hub assembly 10 further comprises a cable 40. As seen in FIG. 5, the cable 40 enters the hub assembly 10 thorough an opening 18a of the end cap 18. Here, as seen in FIG. 9, the cable 40 is an electric cable that is electrically connected to the electric component 38. The cable 40 has a first end 40a and a second end 40b. The cable 40 has a longitudinal axis C1 that extend between the first end 40a and the second end 40b. The first end 40a is spaced from the second end 40b by an intermediate section 40c of the cable 40. The first end 40a is electrically connected to the electric component 38. The second end 40b is electrically connected to another electric component of the human-powered vehicle V such as the rear derailleur RD, the battery pack BP or an electrical junction. Here, the second end 40b is an electrical connector.

Also, the cable 40 has a first portion 40d that is disposed inside of the hub assembly 10 and a second portion 40e disposed outside of the hub assembly 10. Basically, the first portion 40d of the cable 40 is at least partly extending along the rotational center axis A1. In other words, the first portion 40d of the cable at least partly extends substantially parallel to the rotational center axis A1. The cable 40 extends outside of the hub assembly 10 through the opening 18a of the end cap 18. Thus, the second portion 40e of the cable 40 corresponds to the portion of the cable 40 exiting the opening 18a of the end cap 18, while the first portion 40d corresponds to the cable 40 that is not exposed from the hub assembly 10. Here, the opening 18a of the end cap 18 has a center axis B1 that is parallel to the center rotational axis A1 of the hub assembly 10. The opening 18a can have a central axis B1 along the central rotation axis A1. Here, in the illustrated embodiment, the rotation restriction part 21 includes a cable guide structure 21a that configured to guide the second portion 40e of the cable 40 in an angled direction with respect to the rotational center axis A1. Also, in the illustrated embodiment, the cable guide structure 21a is further configured to guide the cable 40 in a radial direction of the hub axle 12. Preferably, the cable guide structure 21a includes a groove 21b that is configured to guide the cable 40.

Preferably, as in the illustrated embodiment, the cable 40 is disposed in an axially extending recess or groove 12d of the hub axle 12 as seen in FIG. 5. Thus, the groove 12d constitutes a cable receiving passageway for the cable 40. The groove 12d, for example, extends from the second axial end 12b to inside the housing 42 of the electric component 38. In this way, cable 40 can be located in the groove 12d between the electric component 38 and the second axial end 12b of the hub axle 12. Here, the groove 12d extends from the second axial end 12b past the electric power generator 60.

The hub assembly 10 further comprises a cable protector 41. Basically, the cable protector 41 is disposed on the hub axle 12. In other words, the cable protector 41 is connected to the hub axle 12. More specifically, the cable protector 41 is disposed on the end cap 18. Even more specifically, the cable protector 41 is disposed on the rotation restriction part 21 of the end cap 18. The cable protector 41 is movably arranged with respect to the hub axle 12 between a first position and a second position. The second portion 40e of the cable 40 extends along the rotational center axis A1 where the cable protector 41 is in the first position. In other words, the second portion 40e of the cable 40 is configured to extend along an axis that is parallel to the rotational center axis A2 in a state in which the cable protector 41 is in the first position. The second portion 40e of the cable 40 is at least partly restrained in an angled position with respect to the rotational center axis A1 where the cable protector 41 is in the second position. In the illustrated embodiment, the cable protector 41 is used with the hub axle 12 which has a quick release skewer (the wheel holding mechanism 22). Here, the rear frame body RB has a pair of U-shaped axle attachments that each have an open-ended slot for receiving a portion the skewer 22a. In other words, when the hub assembly 10 is used with a quick release skewer, there is nothing other than the cable protector 41 in the axial direction when the wheel is attached to the rear frame body RB to restrict outward movement of the cable 40. Therefore, in this type of the quick release arrangement, the cable protector 41 is particularly useful in order to maintain the cable 40 in a bent position when the cable protector 41 is in the second position.

In the illustrated embodiment, the cable protector 41 is pivotally mounted with respect to the hub axle 12 between the first position and the second position. Thus, the cable protector 41 has a pivot axis P1. The pivot axis P1 extends in a twisted or intersecting relationship with respect to the rotational center axis A1 of the hub body 14. Thus, the pivot axis P1 is not parallel to the rotational center axis A1 of the hub body 14. Here, the pivot axis P1 is perpendicularly arranged relative to the rotational center axis A1.

Here, the cable protector 41 is a wire rod. The wire rod of the cable protector 41 has a first end 41a and a second end 41b. The first end 41a and the second end 41b are coupled to the rotation restriction part 21 of the end cap 18. More specifically, the cable protector 41 is attached inside the groove 21b of the cable guide structure 21a. Preferably, the rotation restriction part 21 further includes a pair of recesses 21c and a pair of recesses 21d that cooperate with the cable protector 41 as discussed below.

Also, the cable protector 41 further includes a cable restricting portion 41c that is wider than a width of the cable 40. The cable restricting portion 41c is configured to contact the second portion 40e of the cable 40 where the cable protector 41 is in the second position. The cable restricting portion 41c is also wider than a transverse width of the groove 21b of the cable guide structure 21a. The cable protector 41 has a first leg portion 41d and a second leg portion 41e. The cable protector 41 is maintained in the second position when each of the leg portions 41d and 41e engages with one of the recesses 21c. The first leg portion 41d and the second leg portion 41e are configured to engage the cable guide structure 21a so that the cable protector 41 can be maintained in either the first position or the second position by a spring force of the first leg portion 41d and the second leg portion 41e. Namely, the cable protector 41 can be maintained in either the first position or the second position in an overridable manner. In particular, to install and or uninstall the cable protector 41 in the recesses 21c of the rotation restriction part 21, the cable protector 41 is resiliently deformed as the cable protector 41 moves into and out of the recesses 21c of the rotation restriction part 21.

Here, the rotation restriction part 21 includes a recess (e.g., the recesses 21c), and the cable protector 41, which is releasably retained in the recess (e.g., the recesses 21c) where the cable protector 41 is in the second position. In other words, at least one recess is proved to the rotation restriction part 21 to releasably retain the cable protector 41 in the second position. On the other hand, the recesses 21d pivotally couple the cable protector 41 to the rotation restriction part 21. In particular, the first end 41a of the cable protector 41 is disposed in one of the recesses 21d, and the second end 41b is disposed in the other one of the recesses 21d. The first end 41a and the second end 41b define a pivot axis P1 for the cable protector 41. Since the recesses 21d are elongated slots in the illustrated embodiment, the pivot axis P1 may not be fixed relative to the rotation restriction part 21. Rather, it is possible for the pivot axis P1 to shift along the recesses 21d. However, in a case where each of the leg portions 41d and 41e engages one of the recesses 21c, the shift of the cable protector 41 along the recesses 21d is restricted. Further, a recess or a hole into which the first end 41a and the second end 41b are inserted can be provided in the recess 21d. This configuration restricts the shift of the cable protection member 41 along the recess 21d. The cable protector 41 is attached to the recess 21d without being deformed. However, the cable protector 41 can be attached to the recess 21d in a deformed state.

Here, as seen in FIG. 23, the recesses 21c are located on opposite sides of the groove 21b of the cable guide structure 21a. Each of the recesses 21c is located on one of surfaces of the groove 21b facing each other so as to sandwich the cable 40. Likewise, the recesses 21d are also located on opposite sides of the groove 21b of the cable guide structure 21a. Each of the recesses 21d is located on one of surfaces of the groove 21b facing each other so as to sandwich the cable 40. Further, on each side of the groove 21b, the corresponding ones of the recesses 21c and the recesses 21d are aligned. With this configuration, the first end 41a is disposed on a first side of a reference plane RP, and the second end 41b is disposed on a second side of the reference plane RP in a case where the reference plane RP entirely contains the rotational center axis A1, and is perpendicular to the pivot axis P1 of the cable protector 41. In other words, when the cable protector 41 is in the first (non-restricting) position as seen in FIGS. 15, 16, 21 and 22, the first end 41a is disposed in the recess 21d on the first side of the reference plane RP, and the second end 41b is disposed in the recess 21d on the second side of the reference plane RP. In this way, in the first (non-restricting) position, the cable protector 41 can be freely moved relative to the rotation restriction part 21 while the first end 41a and the second end 41b are in the recesses 21d. When the cable protector 41 is in the second (restricting) position as seen in FIGS. 17, 18 and 23 to 25, the first end 41a and the second end 41b are disposed in the recesses 21d, and the leg portions 41d and 41e are disposed in the recesses 21c. In this way, in the second (restricting) position, the movement of the cable protector 41 is restricted relative to the rotation restriction part 21. In the illustrated embodiment, the recesses 21c are mirror images of each other with respect to the reference plane RP. Likewise, the recess 21d are mirror images of each other with respect to the reference plane RP. The recesses 21c and the recess 21d have openings that are in direct communication with the groove 21b of the cable guide structure 21a. The recesses 21c and the recess 21d each have a width extending in a direction parallel to the rotational center axis A1 of the hub body 14 where the widths are equal to or slightly larger than the diameter of the wire that forms the cable protector 41.

Here, the electric component 38 includes a housing 42. The housing 42 is configured to define the opening 38a of the electric component 38 that receives the hub axle 12. The housing 42 has a first surface 42a, a second surface 42b and the opening 38a. The opening 38a extends from the first surface 42a to the second surface 42b. The second surface 42b is located on the opposite side of the electric component 38 with respect to the first surface 42a. In the illustrated embodiment, the first surface 42a faces the first axial end 12a of the hub axle 12, while the second surface 42b faces the second axial end 12b of the hub axle 12. Here, the hub axle 12 extends through the opening 38a of the electric component 38.

Here, the electric component 38 further comprises a spacer 43 that is provided between the hub axle 12 and the electric component 38 in a radial direction with respect to the rotational center axis A1. In other words, the hub assembly 10 further comprises the spacer 43 provided between the hub axle 12 and the electric component 38 in a radial direction with respect to the rotational center axis A1.

The spacer 43 is a tubular support having a cylindrical guide portion 43a and an annular abutment portion 43b. The guide portion 43a is included in the spacer 43.

Also, the electric component 38 includes an electric circuit board 44. The electric component 38 is disposed in the hub body 14. Thus, the electric circuit board 44 is disposed in the housing 42. The electric cable 40 is electrically connected to the electric circuit board 44. Specifically, the first end 40a of the cable 40 is electrically connected to the electric circuit board 44.

As seen in FIG. 5, the cable 40 enters the hub assembly 10 thorough an opening 18a of the end cap 18. Then, the cable 40 extends axially along the hub axle 12 and passes through the bearing spacer 28. The cable 40 enters the housing 42 of the electric component 38 through the lid 46.

In the illustrated embodiment, the housing 42 includes a housing body 45 and a lid 46. The lid 46 is attached to the housing body 45 for enclosing the electric circuit board 44 in the housing 42. Here, the lid 46 is bonded to the housing body 45 by adhesive or welding. However, the lid 46 can be attached to the housing body 45 by threaded fastener, rivets, etc. Preferably, the housing body 45 and the lid 46 are rigid members made from a suitable material. For example, the housing body 45 and the lid 46 are made of a resin material. For example, the housing body 45 and the lid 46 can each be injected molded members. In the illustrated embodiment, the bearing spacer 28 is fixedly attached to the housing 42 by a plurality of threaded fasteners 47. The threaded fasteners 47 are threaded into the lid 46 of the housing 42.

The housing 42 is non-rotatable with respect to the hub axle 12. In the illustrated embodiment, the electric circuit board 44 is disposed in the housing 42, which is non-rotatable with respect to the hub axle 12. The housing 42 is configured to house the electric circuit board 44 as well as other items elements. In particular, the housing 42 has an outer peripheral surface defining an internal space 42c in which the electric circuit board 44 is disposed. The first surface 42a of the housing 42 includes a plurality of keying protrusions 42d. As described later, the keying protrusions 42d can be provided to engage a non-rotatable member that is provided to the hub axle 12 for non-rotatably coupling the housing 42 to the hub axle 12.

As seen in FIGS. 5 to 8 and 10, the lid 46 is coupled to the housing body 45 to protect the electric circuit board 44 and other parts contained in the housing 42. The lid 46 overlies the internal space 42c of the housing body 45. Thus, at least the housing 42, the electric circuit board 44 and the capacitor 54 can be considered to constitute an electrical unit that is disposed in the hub body 14. The internal space 42c has a donut shape in that the hub axle 12 passes through a center area of the housing 42. In this way, the electric circuit board 44 is non-rotatable with respect to the hub axle 12. The electric circuit board 44 is disposed perpendicular to the rotational center axis A1. The electric circuit board 44 is a part of the electric component 38.

As seen in FIG. 9, in the illustrated embodiment, the electric circuit board 44 has an arc shape. Here, the electric circuit board 44 has a first circumferential end portion 44a and a second circumferential end portion 44b. The electric circuit board 44 also has at least one arc shaped edge extending at least partly from the first circumferential end portion 44a to the second circumferential end portion 44b. Here, the at least one arc shaped edge includes at least one of an inner arc shaped edge 44c and an outer arc shaped edge 44d with respect to the rotational center axis A1. The electric circuit board 44 further includes an electronic controller 48 that provided on the electric circuit board 44. The electronic controller 48 is configured to receive a detection signal from the rotation detection sensor 52. The electronic controller 48 includes at least one processor that executes predetermined control programs. The at least one processor can be, for example, a central processing unit (CPU) or a micro processing unit (MPU). The term "electronic controller" as used herein refers to hardware that executes a software program, and does not include a human. Preferably, the electric circuit board 44 further includes a data storage device (memory) that provided on the electric circuit board 44. The data storage device (memory) stores various control programs and information used for various control processes including power generation control, power storage control, hub rotation detection control, etc. The data storage device includes any computer storage device or any non-transitory computer-readable medium with the sole exception of a transitory, propagating signal. For example, the data storage device includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

Figure 8:
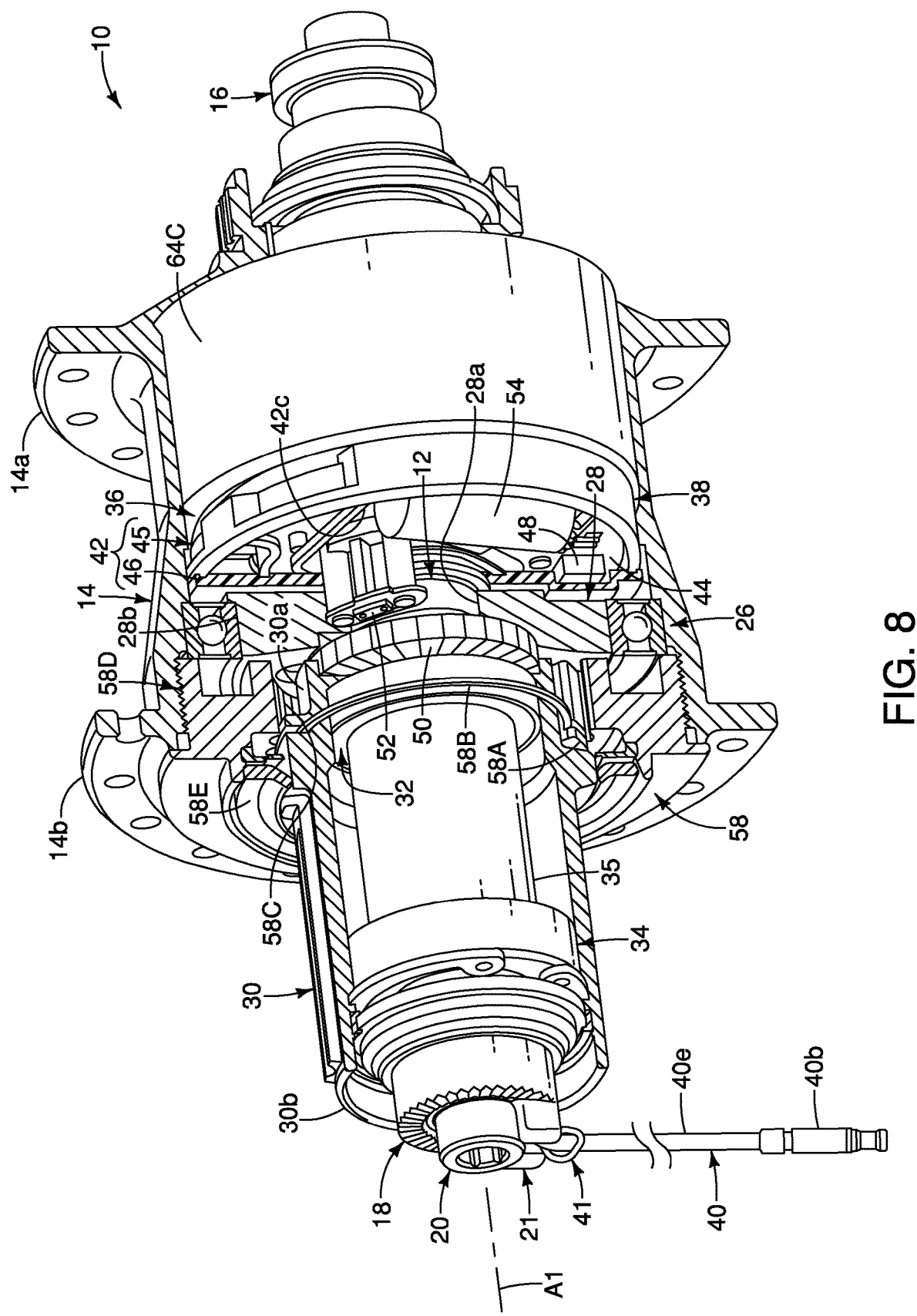
FIG. 8 is a perspective view of the hub assembly illustrated in FIGS. 2 to 5 in which selected portions of the hub broken away.

As seen in FIG. 8, the hub assembly 10 further comprises a detected part 50 coupled to the sprocket support structure 30. In particular, the detected part 50 is fixed to the sprocket support structure 30 so that the detected part 50 and the sprocket support structure 30 rotate together about the hub axle 12. The hub assembly 10 further comprises a rotation detection sensor 52 that is configured to detect the detected part 50 to detect rotation of the sprocket support structure 30 around the rotational center axis A1. The rotation detection sensor 52 is disposed in the hub body 14. In other words, the rotation detection sensor 52 is configured to detect the detected part 50 that is provided to the sprocket support structure 30. In particular, the rotation detection sensor 52 is provided in the internal space 42c of the housing 42. In this way, the rotation detection sensor 52 is non-rotatably mounted to the hub axle 12. Thus, the rotation detection sensor 52 does not rotate with the hub body 14. The rotation detection sensor 52 is also a part of the electric component 38. The rotation detection sensor 52 is electrically connected to the electric circuit board 44. As seen in FIG. 8, the rotation detection sensor 52 is disposed in the hub body 14 at a location spaced radially outward from the hub axle 12.

Figure 10:
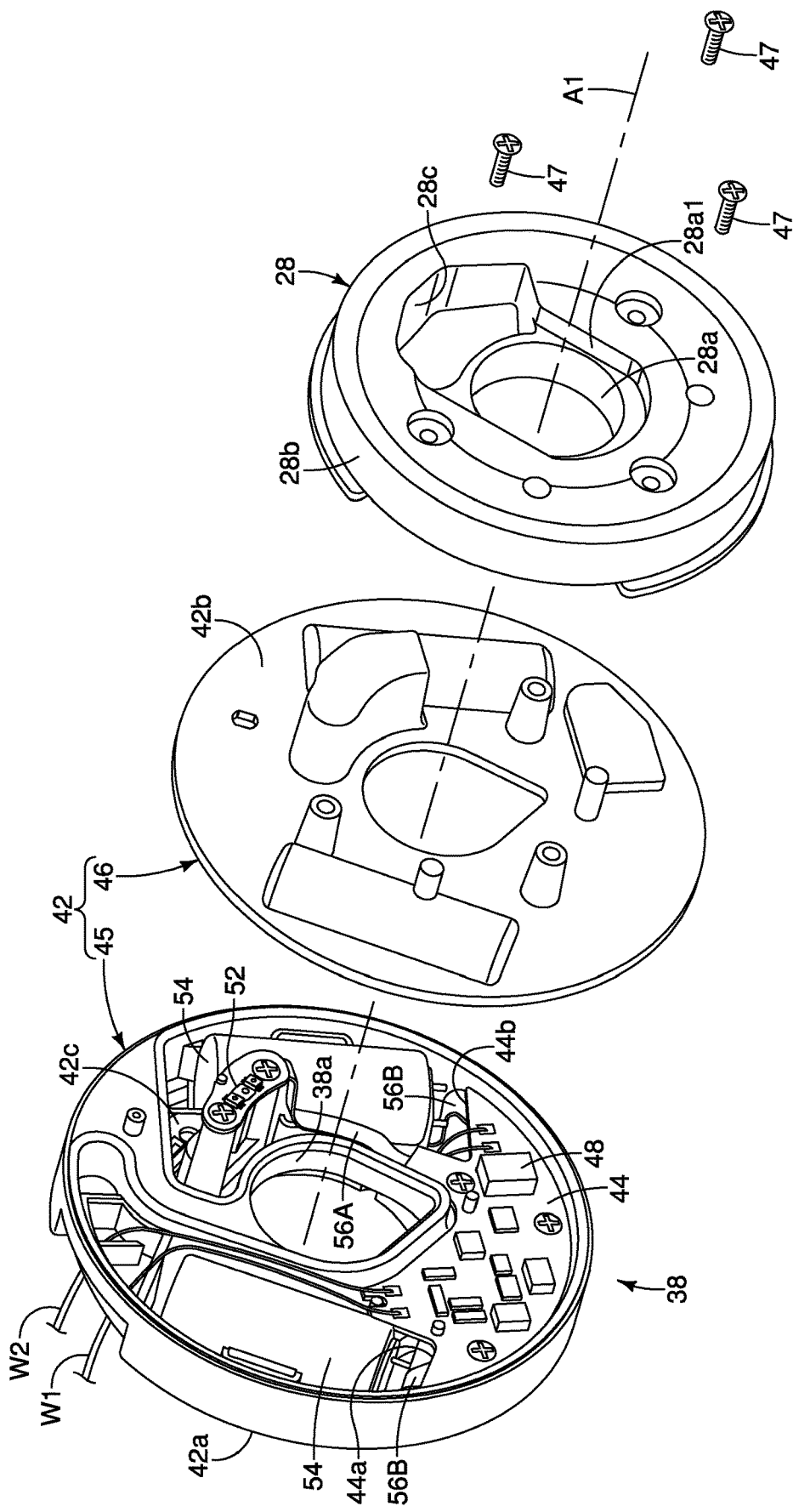
FIG. 10 is a partial exploded perspective view of the electrical assembly of the hub assembly illustrated in FIGS. 2 to 5.

As seen in FIGS. 8 to 10, the rotation detection sensor 52 is disposed at a position that is axially aligned within the axial opening 28c of the bearing spacer 28. In this way, the bearing spacer 28 does not interfere with the rotation detection sensor 52 detecting the detected part 50 that is provided to the sprocket support structure 30. As seen in FIGS. 8 to 10, the rotation detection sensor 52 disposed at a position separated from the electric circuit board 44. In particular, the rotation detection sensor 52 is arranged at a position separated from the electric circuit board 44 in a direction parallel to the rotational center axis A1. The rotation detection sensor 52 is electrically connected to the electric circuit board 44.

In the illustrated embodiment, the rotation detection sensor 52 includes a magnetic sensor, and the detected part 50 includes a magnet. Thus, the magnetic sensor detects movement of the magnet, which rotates together with the sprocket support structure 30. In other words, with this arrangement, the rotation detection sensor 52 is configured to detect the detected part 50 to detect rotation of the sprocket support structure 30 around the rotational center axis A1. The electronic controller 48 is configured to receive a detection signal from the rotation detection sensor 52.

Here, the magnet of the detected part 50 is an annular member with alternating S-pole sections and N-pole sections. In this way, the rotation detection sensor 52 can detect a rotational amount and a rotational direction of the sprocket support structure 30. However, the detected part 50 is not limited to the illustrated annular member. For example, the detected part 50 can be formed of a single non-annular magnet, or two or more magnets that are circumferentially spaced apart about the rotational center axis A1. In the case of using two or more circumferentially spaced magnets, a back yoke can be provided and the circumferentially spaced magnets can be provided to the back yoke. In this way, the circumferentially spaced magnets can be easily installed in the hub 10. The term "sensor" as used herein refers to a hardware device or instrument designed to detect the presence or absence of a particular event, object, substance, or a change in its environment, and to emit a signal in response. The term "sensor" as used herein do not include a human.

The hub assembly 10 further comprises at least one capacitor 54 electrically connected to the electric circuit board 44. The at least one capacitor is electrically connected to the at least one conductor. Here, the electric component 38 comprises two capacitors 54. The capacitors 54 are examples of an electric power storage of the electric component 38. In other words, the capacitor 54 is also a part of the electric component 38. The capacitors 54 are preferably disposed in the housing 42 of the hub assembly 10. Thus, the capacitors 54 are non-rotatably supported on the hub axle 12 by the housing 42.

As explained below, an additional conductor electrically connecting the rotation detection sensor 52 and the electric circuit board 44. Also, here, the electric component 38 comprises a first conductor 56A and a pair of second conductors 56B. The rotation detection sensor 52 is electrically connected to the electric circuit board 44 by the first conductor 56A. Here, the first conductor 56A is a flexible tape conductor. The first conductor 56A can be an electrically conductive lead. On the other hand, the electric circuit board 44 is electrically connected to the capacitors 54 by the second conductors 56B. The second conductors 56B extend from one of the first circumferential end portion 44a and the second circumferential end portion 44b. Here, one of the second conductors 56B extends from the first circumferential end portion 44a to electrical connect one of the capacitors 54 to the electric circuit board 44. The other one of the second conductors 56B extends from the second circumferential end portion 44b to electrical connect the other one of the capacitors 54 to the electric circuit board 44. Here, the second conductors 56B are flexible tape conductors. The second conductors 56B can be an electrically conductive lead. The capacitor 54 is provided in the internal space of the housing 42 at a position other than on the electronic circuit board 44. The capacitor 54 may be held in the housing 42 with an adhesive or the like. The lid 46 is coupled to the housing body 45 to protect the capacitors 54 that are disposed inside the housing 42.

The electric circuit board 44 is electrically connected to the rotation detection sensor 52 and the capacitor 54. In this way, the capacitor 54 provides electrical power to the electric circuit board 44 and other electric components electrically connected to the electric circuit board 44. For example, the capacitor 54 provides electrical power to the rotation detection sensor 52. Also, the electronic controller 48 of the electric circuit board 44 is configured to control the input and output of electric power from the capacitor 54.

As seen in FIGS. 5 to 7, the hub assembly 10 further comprises a one-way clutch 58 that is formed between the hub body 14 and the sprocket support structure 30. The one-way clutch 58 includes a plurality of pawls 58A disposed between the hub body 14 and the sprocket support structure 30. The one-way clutch 58 further includes a biasing element 58B that couples the pawls 58A to the sprocket support structure 30. The one-way clutch 58 further includes a plurality of ratchet teeth 58C. The ratchet teeth 58C are provided to a fixing ring 58D that is fixed to the hub body 14. The ratchet teeth 58C are provided on the inner peripheral surface of the fixing ring 58D. The fixing ring 58D is screwed to the hub body 14. The fixing ring 58D is made of a hard material such as metal. The fixing ring 58D abuts against the outer race 26b of the second hub body bearing 26 in the axial direction with respect to the rotational center axis A1. The opposite side of the outer race 26b of the second hub body bearing 26 in the axial direction abuts against a step formed in the hub body 14. The outer race 26b of the second hub body bearing 26 is restricted in axial movement by the fixing ring 58D and the steps formed on the hub body 14. The biasing element 58B biases the pawls 58A into engagement with the ratchet teeth 58C of the fixing ring 58D. The biasing element 58B squeezes the pawls 58A against the sprocket support structure 30 such that the pawls 58A pivot towards engagement with the ratchet teeth 58C of the fixing ring 58D. A seal member 58E is provided on the fixing ring 58D. The seal member 58E is formed in a ring shape. The tongue portion of the sealing member 58E is in contact with the outer peripheral surface of the sprocket support 30.

In this way, the sprocket support structure 30 is coupled to the hub body 14 to rotate together in the driving rotational direction D1 around the rotational center axis A1. Also, in a case where the sprocket support structure 30 is rotated in the non-driving rotational direction D2, the ratchet teeth 58C of the sprocket support structure 18 push the pawls 58A and pivot the pawls 58A to a retracted position against the sprocket support structure 30. Thus, the sprocket support structure 30 is configured to rotate relative to the hub body 14 in the non-driving rotational direction D2 around the rotational center axis A1. In this way, the sprocket support structure 30 and the one-way clutch 58 form a freewheel that is commonly used in bicycles. Since the basic operation of the freewheel is relatively conventional, the freewheel will not be discussed or illustrated in further detail.

As seen in FIGS. 5 to 7, the hub assembly 10 comprises an electric power generator 60. Here, the electric power generator 60 is considered to be part of the electrical assembly 36. In other words, the electrical assembly 36 comprises the electric power generator 60. The cable 40 is electrically connected the electric power generator 60 via the electric circuit board 44. In this way, the cable 40 can provide electric power generated by the hub assembly 10 to the rear derailleur RD, the battery pack BP or another electric component. The cable 40 can also be used to transmit signals from the electronic controller 48 of the electric circuit board 44 to the rear derailleur RD or another electric component using power line communication (PLC).

The electric power generator 60 is provided to the hub body 14, and is configured to generate electric power by rotation of the hub body 14. More specifically, the electric power generator 60 is provided to the hub body 14 between the hub axle 12 and a center potion of the hub body 14. In the illustrated embodiment, the hub body 14 is rotatably mounted on the axle 12 to rotate around the rotational center axis A1 of the electric power generator 60. The electric power generator 60 is configured to generate electric power by rotation of the hub body 14 relative to the hub axle 12. The electronic controller 48 of the electric circuit board 44 is electrically connected to the electric power generator 60 for controlling the electric power output of the electric power generator 60. Thus, the electric power generated by the electric power generator 60 can be stored and/or supplied directly to other components such as the rotation detection sensor 52, the rear derailleur RD, etc.

Although the electric power generator 60 is illustrated and described as part of the hub assembly 10, the electric power generator 60 can be applied to a different part of the human-powered vehicle V. In general, the electric power generator 60 comprises an axle, a stator and a rotor. Thus, the following description of the electric power generator 60 is not limited to being used as part of the hub assembly. Rather, the following description of the electric power generator 60 can be adapted to other parts of the human-powered vehicle V for generating electricity.

Figure 12:
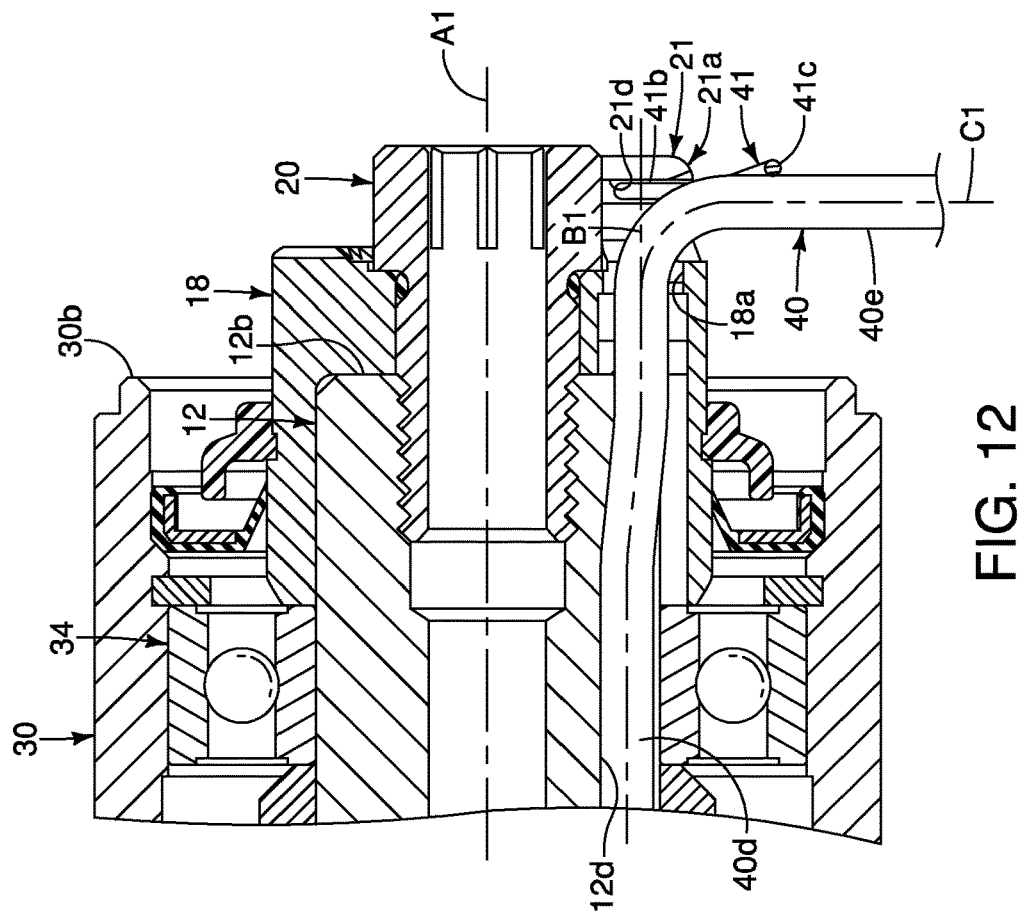
FIG. 12 is a longitudinal cross-sectional view of the end portion illustrated in FIG. 11 in which where the cable protector is in the second (restricting) position.
Figure 11:
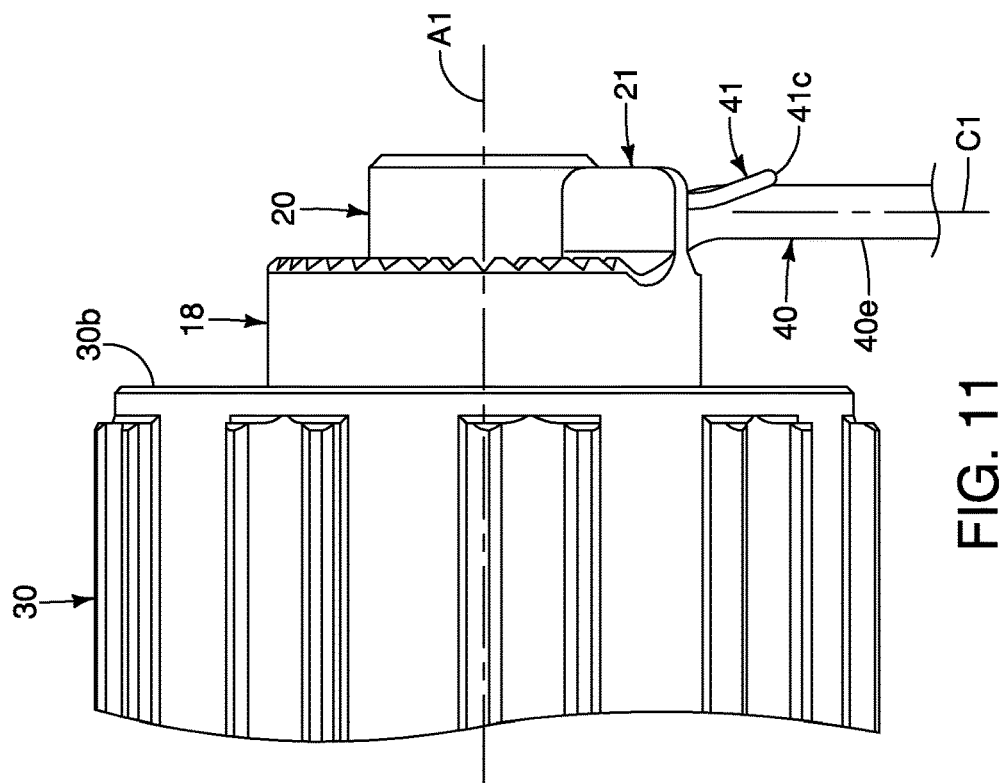
FIG. 11 is a partial side elevational view of an end portion of the hub assembly illustrated in FIGS. 2 to 5 in which the cable is at least partly restrained in an angled position with respect to the rotational center axis of the hub assembly where the cable protector is in a second (restricting) position.
Figure 14:
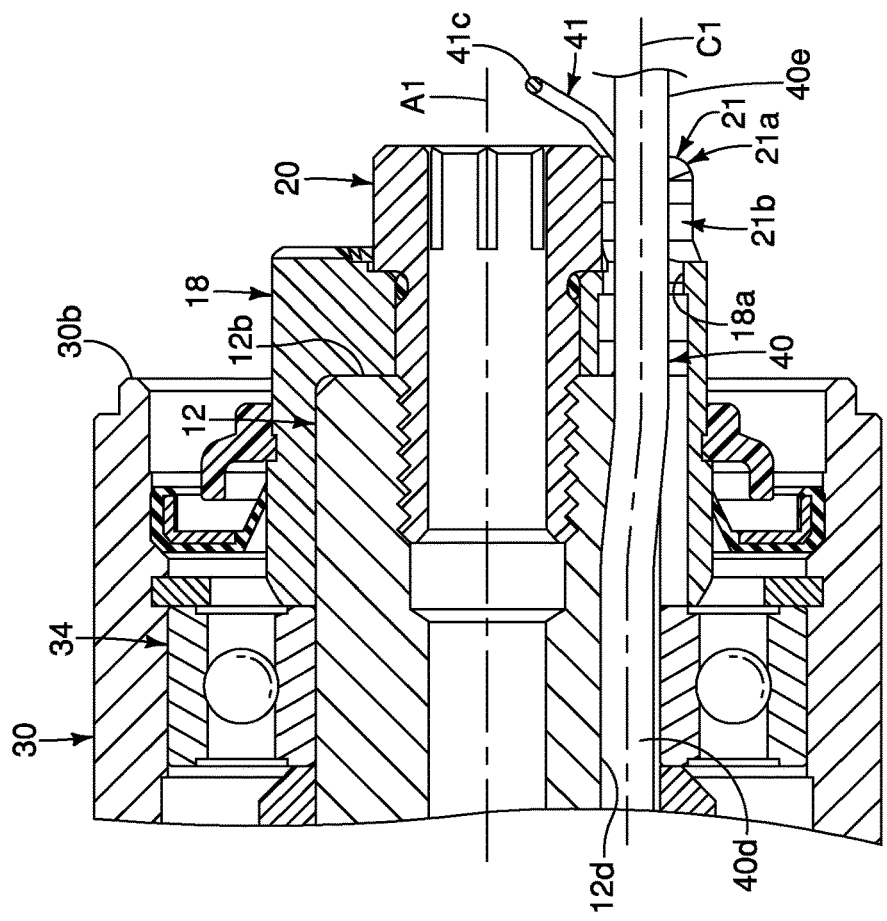
FIG. 14 is a longitudinal cross-sectional view of the end portion illustrated in FIGS. 11 to 13 where the cable protector is in the first (non-restricting) position.
Figure 13:
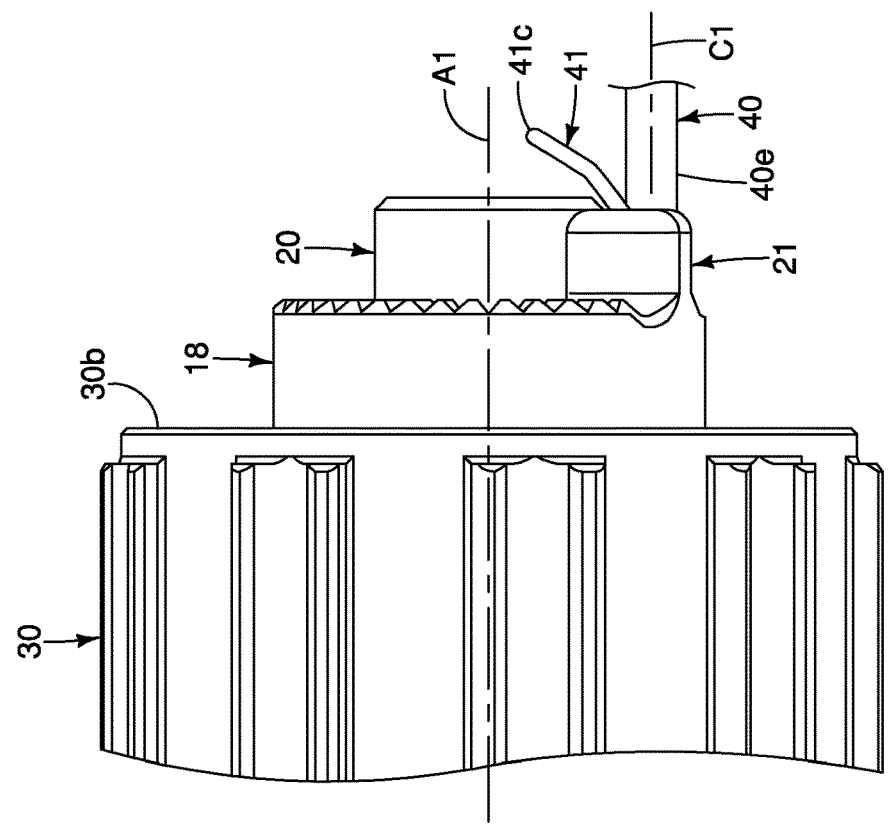
FIG. 13 is a partial side elevational view of the end portion illustrated in FIGS. 11 and 12 but where the cable protector is in a first (non-restricting) position in which the cable is free to be moved parallel to the rotational center axis of the hub assembly.
Figure 16:
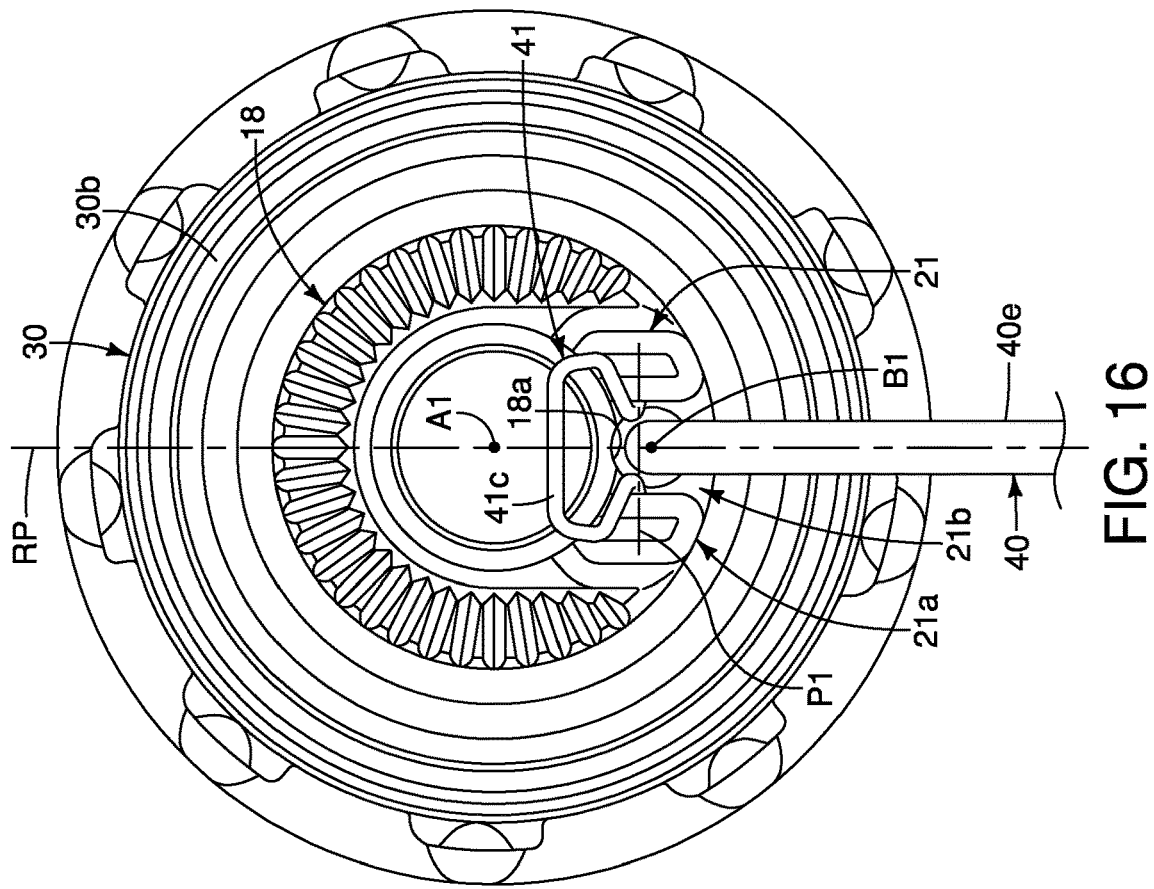
FIG. 16 is a partial end elevational view of the end portion illustrated in FIGS. 11 to 15 where the cable protector is in the first (non-restricting) position.
Figure 15:
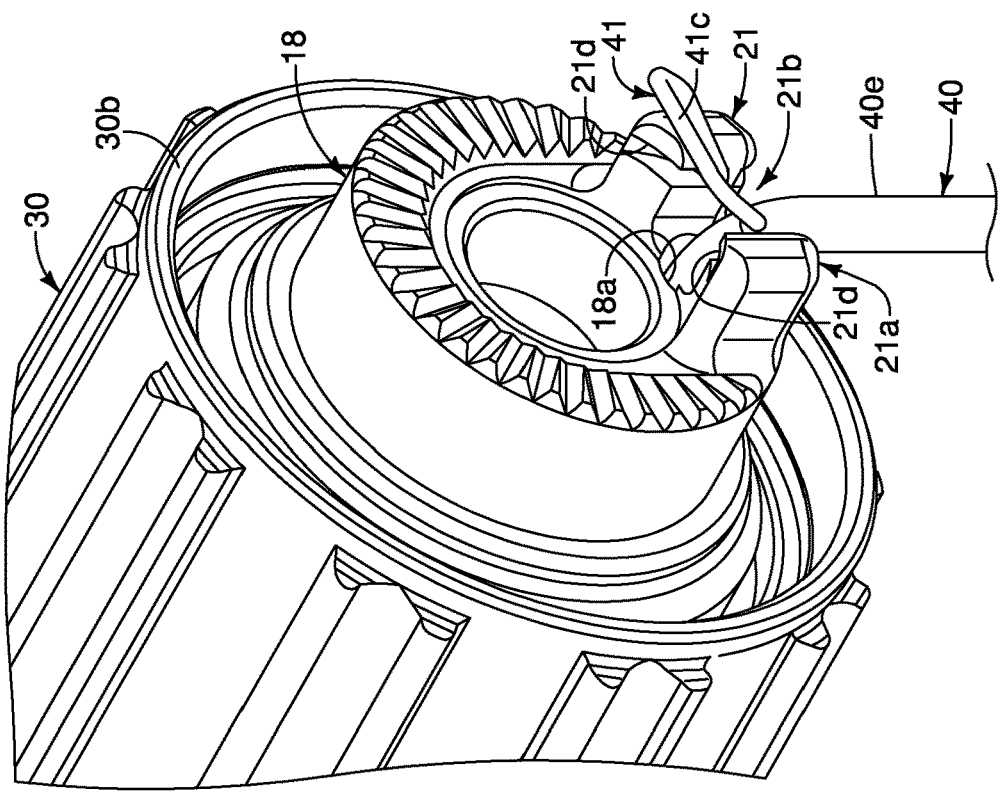
FIG. 15 is a perspective view of the end portion illustrated in FIGS. 11 to 14 but where the cable protector is in the first (non-restricting) position.
Figure 18:
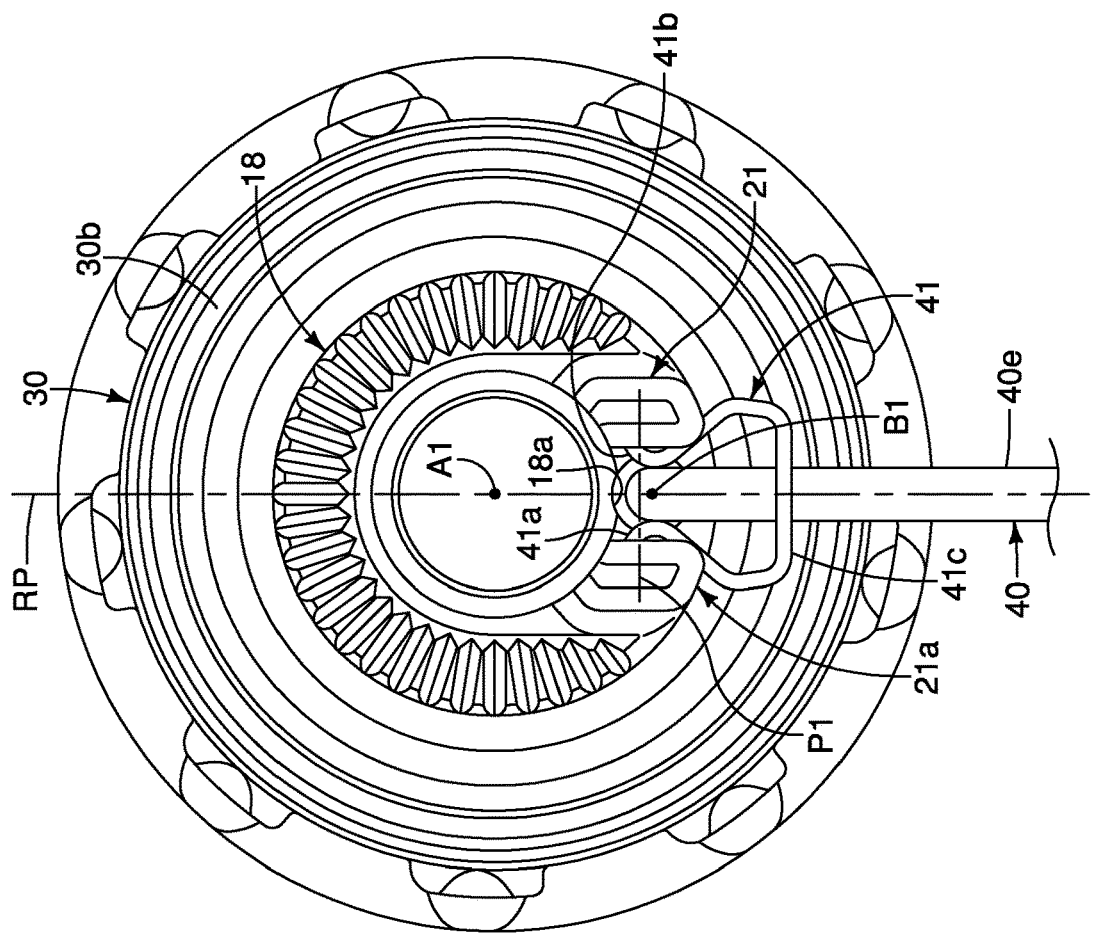
FIG. 18 is a partial end elevational view of the end portion illustrated in FIGS. 11 to 17 where the cable protector is in the second (restricting) position.
Figure 17:
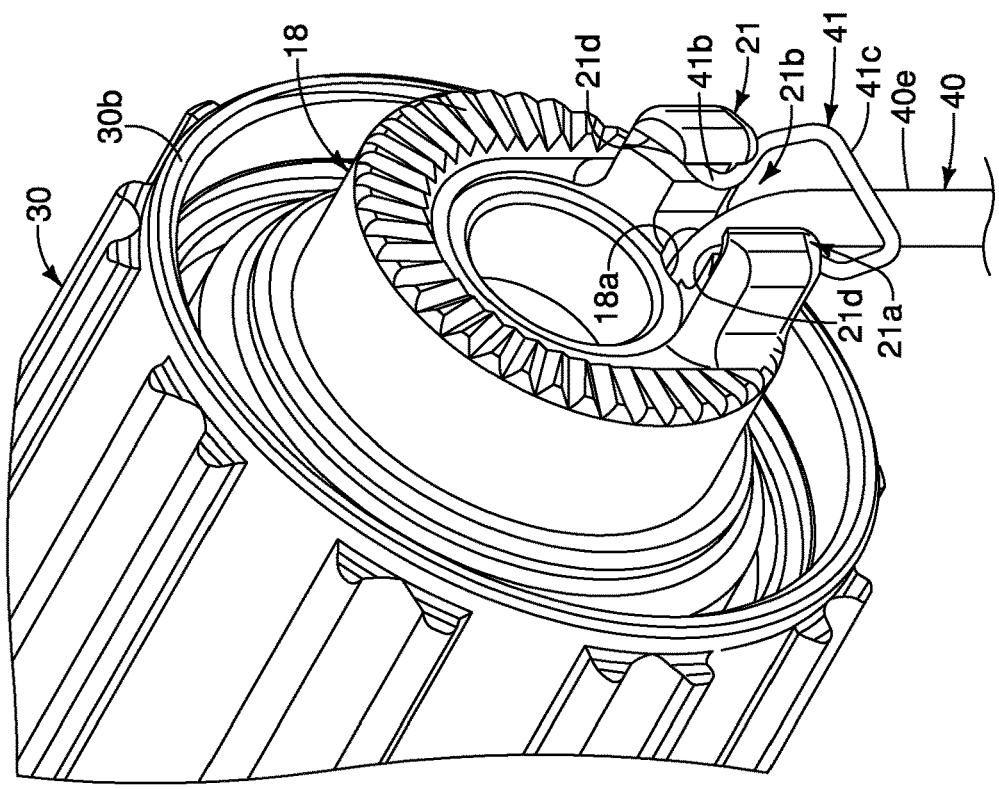
FIG. 17 is a perspective view of the end portion illustrated in FIGS. 11 to 16 but where the cable protector is in the second (restricting) position.
Figure 20:
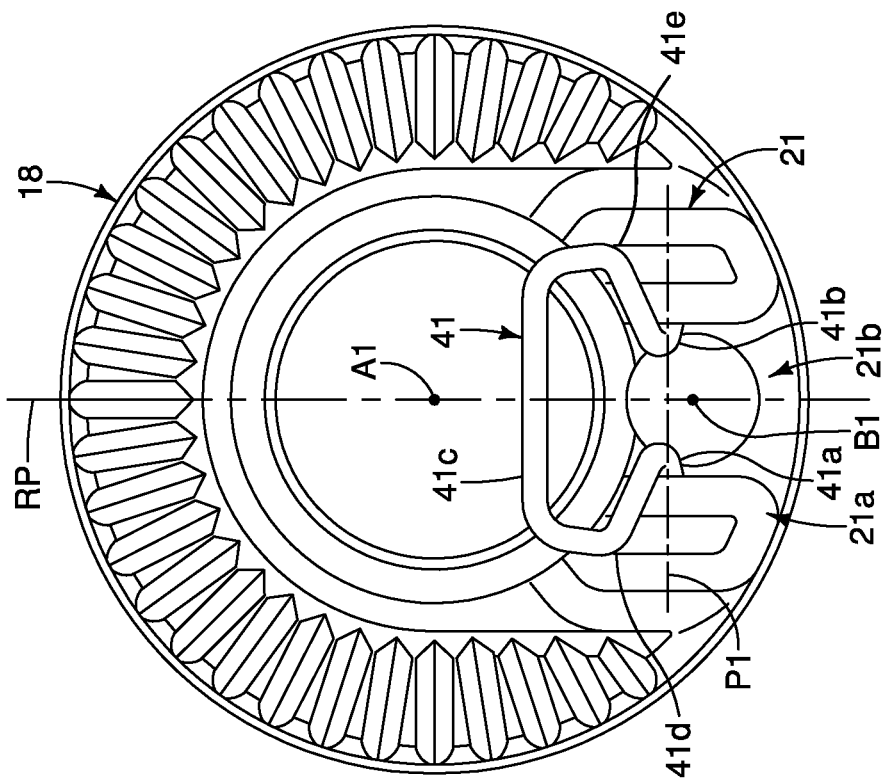
FIG. 20 is an enlarged end elevational view of the end cap of the hub assembly illustrated in FIGS. 2 to 5 in which the cable protector is in the first (non-restricting) position.
Figure 19:
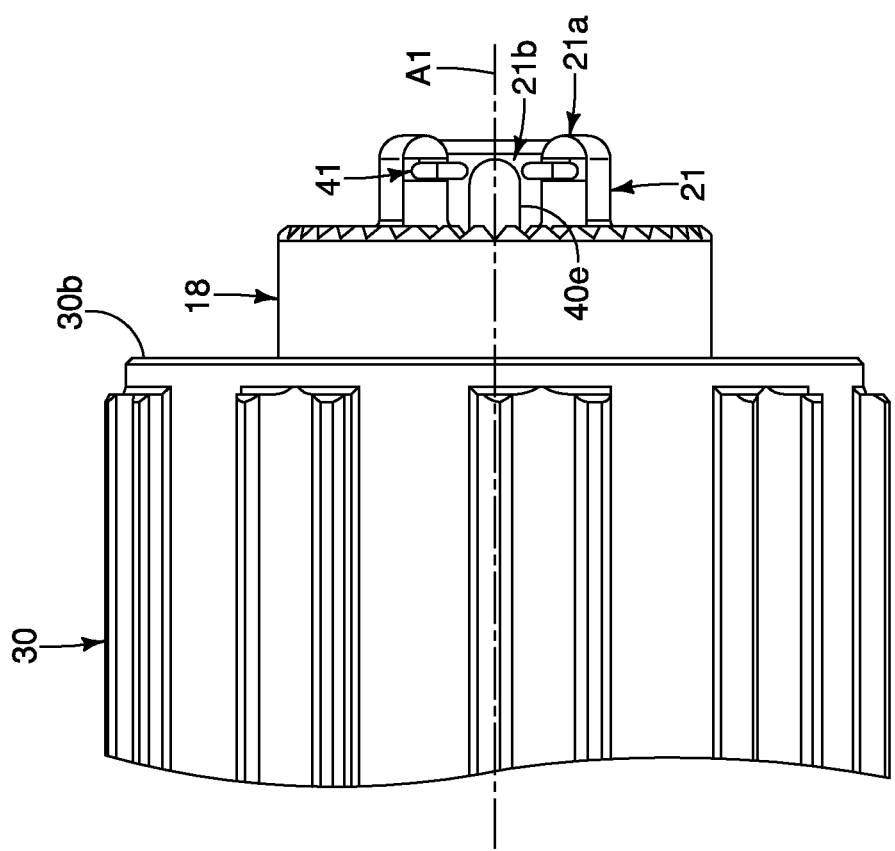
FIG. 19 is a partial top view of the end portion illustrated in FIGS. 11 to 18 in which the cable is at least partly restrained in an angled position with respect to the rotational center axis of the hub assembly where the cable protector is in the second (restricting) position.
Figure 22:
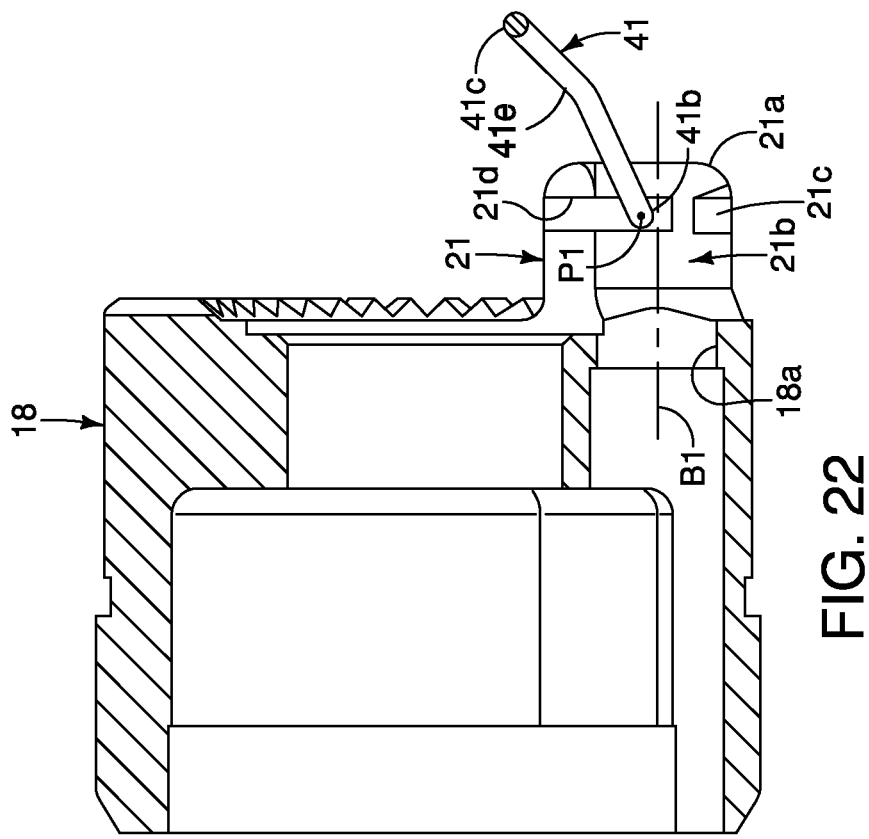
FIG. 22 is a longitudinal cross-sectional view of the end cap illustrated in FIGS. 20 and 21 in which the cable protector is in the first (non-restricting) position.
Figure 21:
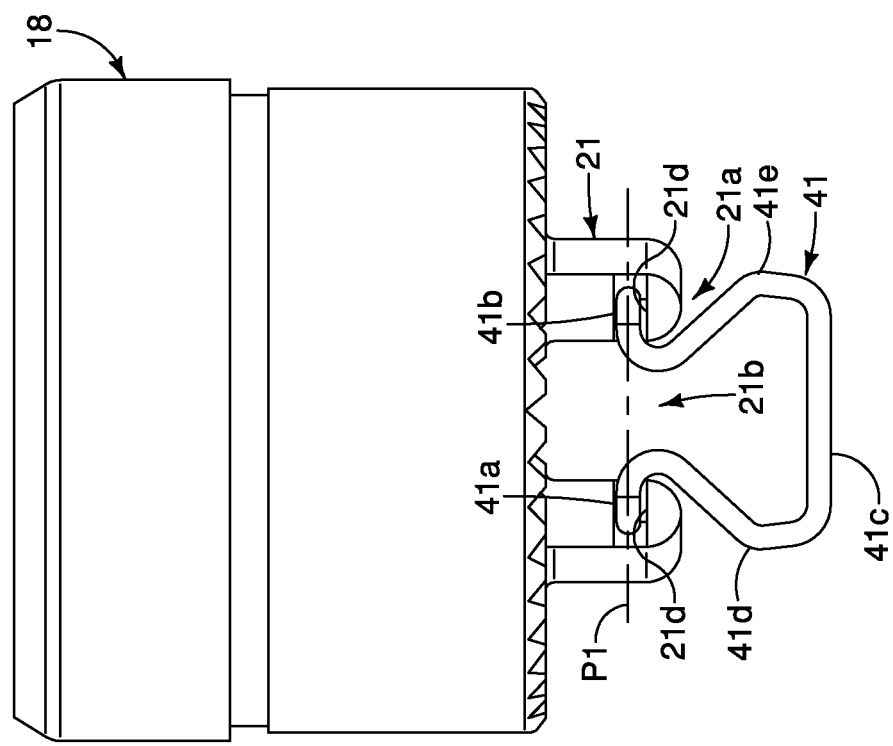
FIG. 21 is an enlarged top view of the end cap illustrated in FIG. 20 in which the cable protector is in the first (non-restricting) position.

In the illustrated embodiment, the electric power generator 60 further includes a stator 62 and a rotor 64. The stator 62 is non-rotatable with respect to the hub axle 12. On the other hand, the rotor 64 is rotatably mounted on the hub axle 12 to rotate around a rotational center axis A1 of the electric power generator 60. In particular, the rotor 64 is provided to the hub body 14 so as to rotate with the hub body 14. Thus, when the hub body 14 rotates with respect to the hub axle 12, the rotor 64 rotates with respect to the stator 62 for power generation. Namely, an induced electromotive force is generated on the stator 62 by the rotation of the rotor 64 and an electrical current flow out of the stator 62 of the electric power generator 60. As seen in FIGS. 6, 9 and 10, the electrical current from the stator 62 is supplied to the electric component 38 via a pair of electrical wires W1 and W2. The electrical wires W1 and W2 are electrically connected to the electric circuit board 44. Here, the electrical wires W1 and W2 extend though openings in an end wall portion of the housing 42, and then passes through the electric power generator 60. As seen in FIG. 9, the electrical wires W1 and W2 are electrically connected to the electric circuit board 44. As seen in FIGS. 11 and 12, the stator 62 has a pair of electrical wires W3 and W4. The electrical wire W3 is electrically connected to the electrical wire W1, and the electrical wire W4 is electrically connected to the electrical wire W2.

As seen in FIGS. 6 and 7, the stator 62 has a first axial stator-end 68A that faces the first axial end 12a of the axle 12 with respect to the rotational center axis A1 and a second axial stator-end 68B that faces the second axial end 12b of the axle 12 with respect to the rotational center axis A1. Here, the stator 62 includes an armature that is disposed on the axle 12. The armature of the stator 62 includes a winding coil 62A and a bobbin 62B.

The winding coil 62A is wound on the bobbin 62B for supporting the winding coil 62A. The winding coil 62A is made of a conductive metal wire material, such as a copper wire or an aluminum alloy wire. The electrical wires W3 and W4 are electrically connected to both ends of the winding coil 62A. The electrical wire W3 is electrically connected to the electrical wire W1 by a first electrical connector EC1. The electrical wire W4 is electrically connected to the electrical wire W2 by a second electrical connector EC2. In this way, electric power generated in the winding coil 62A is transmitted to the electric circuit board 44 of the electric component 38 via the electrical wires W1, W2, W3 and W4. The electric circuit board 44 then regulates the electric power received from the winding coil 62A to selectively store the electric power in the capacitors 54 and/or to selectively transmit the electric power outside of the hub assembly 10 via the cable 40 as explained below.

The bobbin 62B is non-rotatably coupled to the hub axle 12. The bobbin 62B has a cylindrical trunk portion, a first flange portion and a second flange portion. The cylindrical trunk portion has an outside circumference on which the winding coil 62A is wound. The first flange portion and the second flange portion are formed on both axial end portions of the cylindrical trunk portion.

In the illustrated embodiment, the housing 42 is disposed between the sprocket support structure 30 and the stator 62. The first surface 42a faces the second axial stator-end 68B of the stator 62. The first surface 42a is formed by the exterior surface of the end wall portion of the housing 42. Preferably, the housing 42 is disposed adjacent to the stator 62 at the second axial stator-end 68B of the stator 62 in the axial direction with respect to the rotational center axis A1.

Here, the electric circuit board 44 is disposed adjacent the stator 62 at the second axial stator-end 68B of the stator 62 in the axial direction with respect to the rotational center axis A1. The electrical wires W1 and W2 are connected to the electric circuit board 44. In particular, the electric circuit board 44 has a first axially facing surface 44e facing the stator 62 and a second axially facing surface 44f facing away from the stator 62. Here, the electrical wires W1 and W2 are electrically connected to the second axially facing surface 44f of the electric circuit board 44.

The armature of the stator 62 further includes a plurality of first yoke 62C and a plurality of second yoke 62D. The first yokes 62C are arranged in the circumferential direction of the hub axle 12. Likewise, the second yokes 62D are arranged in the circumferential direction of the hub axle 12 and alternate with the first yokes 62C. The winding coil 62A is located between the first yokes 62C and the second yokes 62D in the axial direction of the hub axle 12. Here, the first yokes 62C and the second yokes 62D are fitted to grooves of the bobbin 62B so that the first yokes 62C and the second yokes 62D alternate in a circumferential direction around the rotational center axis A1. The first yokes 62C and the second yokes 62D can be attached to the bobbin 62B by an adhesive, for example.

Each of the first yokes 62C can be a laminated yoke made up of a plurality of laminate pieces or can be a single piece. In the case of laminated yokes, the laminate pieces of the first yokes 62C are laminated together in the circumferential direction about the rotational center axis A1. The laminate pieces of the first yokes 62C are made of, for example, silicon steel sheets (more specifically, non-oriented silicon steel sheets) on the surface of which an oxide film has been formed. The laminate pieces of the first yokes 62C are examples of a plate-like member.

Likewise, the second yokes 62D can be a laminated yoke made up of a plurality of laminate pieces or can be a single piece. In the case of laminated yokes, the laminate pieces of the second yokes 62D are laminated together in the circumferential direction about the rotational center axis A1. The laminate pieces of the second yokes 62D are made of, for example, silicon steel sheets (more specifically, non-oriented silicon steel sheets) on the surface of which an oxide film has been formed. The laminate pieces of the second yokes 62D are examples of a plate-like member.

The rotor 64 includes at least one magnet. Here, in the illustrated embodiment, the rotor 64 includes a plurality of first magnet parts 64A and a plurality of second magnet parts 64B arranged inside a tubular support 64C. The tubular support 64C is fixedly coupled to the inside of the hub body 14 so that the magnet (rotor 64) and the hub body 14 rotate together around the hub axle 12. The tubular support 64C has the function of a back yoke. The back yoke is a member having a high magnetic permeability, which is arranged on the opposite side of the magnetized surface. By using the back yoke, a high generated magnetic field can be obtained. The tubular support 64C can be omitted. Alternatively, the hub body 14 can have the magnet (rotor 64) such that the hub body 14 partially forms the electric power generator 60. The first magnet parts 64A and the second magnet parts 64B are arranged so that S-poles and N-poles of the first magnet parts 64A and the second magnet parts 64B are alternately arranged in the circumferential direction of the hub axle 12. Therefore, the S-poles of the first magnet parts 64A are not aligned with the S-poles of the second magnet parts 64B, and the N-poles of the first magnet parts 64A are not aligned with the N-poles of the second magnet parts 64B in the axial direction of the hub axle 12.

As mentioned above, the winding coil 62A is illustrated as being fixed with respect to the hub axle 12, and the magnet (rotor 64) is illustrated as being fixed with respect to the hub body 14. Alternatively, the winding coil 62A can be fixed with respect to the hub body 14 and the magnet (rotor 64) can be fixed with respect to the hub axle 12.

As seen in FIGS. 6, 9 and 10, the electrical wires W1 and W2 are electrically connected to the stator 62 on the first axial stator-end 68A of the stator 62. The electrical wires W1 and W2 extend axially through the armature of the stator 62. More specifically, the electrical wires W1 and W2 extends axially between the first yokes 62C and the second yokes 62D of the stator 62. Thus, the electrical wires W1 and W2 extend axially through the armature 62 at a point that is radially outward of the winding coil 62A.

The hub assembly 10 further includes two fixing plates 76 and 78 that are provided on the hub axle 12 for non-rotatably coupling the stator 62 of the electric power generator 60 to the hub axle 12. The fixing plates 76 and 78 are provided on opposite axial ends of the electric power generator 60. The fixing plates 76 and 78 have a plate shape. The fixing plate 76 includes a plurality of protrusions 76a, and the fixing plate 78 includes a plurality of protrusion 78a. One of the protrusions 76a of the fixing plate 76 is disposed in the groove 12d of the hub axle 12. Likewise, one of the protrusions 78a of the fixing plate 78 is disposed in the groove 12d of the hub axle 12. The other ones of the protrusions 76a and 78a are disposed in two other axially extending grooves 12e of the hub axle 12. By inserting the protrusions 76a and 78a into these grooves 12d and 12e of the hub axle 12, the fixing plates 76 and 78 do not rotate with respect to the hub axle 12. The stator 62 of the electric power generator 60 does not rotate with respect to the hub axle 12 by the stator 62 engaging with protrusions 76b protruding from an axially facing surface of the fixing plate 76 and protrusions 78b protruding from an axially facing surface of the fixing plate 78. The fixing plates 76 and 78 are arranged so as to sandwich the stator 62 of the electric power generator 60 from both sides in the axial direction of the stator 62 of the electric power generator 60. Alternatively, the rotation of the fixed plates 76 and 78 with respect to the hub axle 12 can also suppressed by providing D-shaped cutouts that matches a corresponding outer surface of the hub axle 12. Optionally, one of the pair of fixing plates 76 and 78 can be omitted.

Also, the housing 42 can be non-rotatably coupled to one of the fixing plate 78 for suppressing rotation of the housing 42 with respect to the hub axle 12. For example, the keying protrusions 42d of the housing 42 are configured to engage openings 78c of the fixing plate 78 that is keyed to the groove 12d of the hub axle 12. The fixing plate 78 includes a plurality of openings 78c corresponding to the keying protrusions 42d. In this way, the housing 42 is prevented from rotating relative to the hub axle 12. Alternatively, the housing 42 can be attached to the bearing spacer 28, which is non-rotatably coupled to the hub axle 12. A nut 80 is threaded on the hub axle 12 for retaining the stator 62 and the housing 42 on the hub axle 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the hub assembly. Accordingly, these directional terms, as utilized to describe the hub should be interpreted relative to a human-powered vehicle (e.g., bicycle) in an upright riding position on a horizontal surface and that is equipped with the hub assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hub assembly for a human-powered vehicle, the hub assembly comprising:
   a hub axle having a first axial end and a second axial end;
   a hub body rotatably mounted on the hub axle to rotate around a rotational center axis of the hub assembly;
   a cable having a first portion disposed inside of the hub assembly and a second portion disposed outside of the hub assembly; and
   a cable protector movably arranged with respect to the hub axle between a first position and a second position, the second portion of the cable being configured to extend along an axis that is substantially parallel to the rotational center axis in a state where the cable protector is in the first position, and the second portion of the cable at least partly being restrained in an angled position with respect to the axis in a state where the cable protector is in the second position.

2. The hub assembly according to claim 1, wherein the cable protector is pivotally mounted with respect to the hub axle between the first position and the second position.

3. The hub assembly according to claim 2, wherein the cable protector has a pivot axis that is not parallel to the rotational center axis of the hub body.

4. The hub assembly according to claim 1, wherein the cable protector is a wire rod.

5. The hub assembly according to claim 4, wherein the wire rod has a first end disposed on a first side of a reference plane and a second end disposed on a second side of the reference plane in a case where the reference plane entirely contains the rotational center axis and is perpendicular to a pivot axis of the cable protector.

6. The hub assembly according to claim 1, wherein the first portion of the cable is at least partly extending substantially parallel to the rotational center axis.

7. The hub assembly according to claim 1, further comprising
a rotation restriction part configured to be disposed between the hub axle and a frame of the human-powered vehicle so that rotation of the hub axle relative to the frame is restricted.

8. The hub assembly according to claim 7, wherein
the rotation restriction part is detachably attached to the hub axle.

9. The hub assembly according to claim 7, wherein
the rotation restriction part includes a cable guide structure configured to guide the second portion of the cable in an angled direction with respect to the rotational center axis.

10. The hub assembly according to claim 9, wherein
the cable guide structure is further configured to guide the cable in a radial direction of the hub axle.

11. The hub assembly according to claim 9, wherein
the cable guide structure includes a groove configured to guide the cable.

12. The hub assembly according to claim 11, wherein
the cable protector is attached inside the groove of the cable guide structure.

13. The hub assembly according to claim 11, wherein
the cable protector includes a cable restricting portion that is wider than a width of the cable.

14. The hub assembly according to claim 7, wherein
the rotation restriction part includes a recess, and
the cable protector is releasably retained in the recess in a state where the cable protector is in the second position.

15. The hub assembly according to claim 14, wherein
the cable protector is resiliently deformed as the cable protector moves into and out of the recess.

16. The hub assembly according to claim 1, further comprising
an electric component non-rotatably disposed with respect to the hub axle, and wherein
the cable is an electric cable electrically connected to the electric component.

17. The hub assembly according to claim 16, wherein
the electric component including an electric circuit board, and
the electric cable is electrically connected to the electric circuit board.

18. The hub assembly according to claim 1, further comprising
an electric power generator provided to the hub body, and configured to generate electric power by rotation of the hub body.

19. The hub assembly according to claim 1, further comprising
a sprocket support structure rotatably disposed around the rotational center axis to transmit a driving force to the hub body while rotating in a driving rotational direction around the rotational center axis.

20. A hub assembly for a human-powered vehicle, the hub assembly comprising:
a hub axle having a first axial end and a second axial end;
a hub body rotatably mounted on the hub axle to rotate around a rotational center axis of the hub assembly;
a cable having a first portion disposed inside of the hub assembly and a second portion disposed outside of the hub assembly; and
a cable protector being a wire rod and connected to the hub axle, and the second portion of the cable at least partly being restrained in an angled position with respect to the rotational center axis.

21. A hub assembly for a human-powered vehicle, the hub assembly comprising:
a hub axle having a first axial end and a second axial end;
a hub body rotatably mounted on the hub axle to rotate around a rotational center axis of the hub assembly;
a cable having a first portion disposed inside of the hub assembly and a second portion disposed outside of the hub assembly; and
a cable protector movably arranged with respect to the hub axle between a first position and a second position,
the second portion of the cable at least partly being restrained in an angled position with respect to an axis that is substantially parallel to the rotational center axis in a state where the cable protector is in the second position, and
the second portion of the cable being substantially unrestrained by the cable protector in a state where the cable protector is in the first position.

* * * * *